US012786101B2

(12) United States Patent
Prajapat et al.

(10) Patent No.: US 12,786,101 B2
(45) Date of Patent: Nov. 3, 2026

(54) COMMUNICATIONS METHODS AND APPARATUS FOR DETERMINING BEST-QUALITY REALTIME-MEDIA PATH IN UNIFIED COMMUNICATIONS APPLICATIONS

(71) Applicant: Ribbon Communications Operating Company, Inc., Westford, MA (US)

(72) Inventors: Surendra Prajapat, Cupertino, CA (US); Rumus Sakya, Livermore, CA (US)

( * ) Notice: Subject to any disclaimer, the term of this patent is extended or adjusted under 35 U.S.C. 154(b) by 688 days.

(21) Appl. No.: 18/214,991

(22) Filed: Jun. 27, 2023

(65) Prior Publication Data

US 2023/0344748 A1 Oct. 26, 2023

Related U.S. Application Data

(63) Continuation of application No. 17/014,745, filed on Sep. 8, 2020, now Pat. No. 11,736,386.

(51) Int. Cl.

| | |
|---|---|
| ***H04L 45/12*** | (2022.01) |
| ***H04L 12/18*** | (2006.01) |
| ***H04L 45/122*** | (2022.01) |
| ***H04L 45/302*** | (2022.01) |
| ***H04W 40/12*** | (2009.01) |

(52) U.S. Cl.

CPC ........ *H04L 45/123* (2013.01); *H04L 12/1886* (2013.01); *H04L 45/122* (2013.01); *H04L 45/3065* (2013.01); *H04W 40/12* (2013.01)

(58) Field of Classification Search

None

See application file for complete search history.

(56) References Cited

U.S. PATENT DOCUMENTS 6,594,268 B1 * 7/2003 Aukia .................. H04L 45/302 370/235
8,588,230 B1 * 11/2013 Smith .................. H04L 47/829 370/389
9,197,544 B2 * 11/2015 Smith ..................... H04L 45/24
10,303,464 B1 * 5/2019 Wolfson .............. G06F 11/3698
11,146,599 B1 * 10/2021 Jackson .............. H04L 12/1827
11,165,691 B1 * 11/2021 Kompella ........... H04L 41/0806
(Continued)

*Primary Examiner* — Mariela Vidal Carpio

(57) ABSTRACT

The present invention relates to methods and apparatus for determining a best or optimal media path or route between communications devices. An exemplary method embodiment of the present invention includes the steps of (i) receiving, at a first communications device, data of a first data communications session, the first data communications session being a first media communications session, the data being media; (ii) selecting an optimal media communications route from a plurality of communications routes between the first communications device and a second communications device; and (iii) communicating the received media of the first media communications session from the first communications device to the second communications device via the selected optimal media communications route. In some embodiments, the optimal media communications route is determined by a UCBot application executing on the first communication device based on media quality metrics for each of the routes determined during test media sessions.

20 Claims, 16 Drawing Sheets

(56) References Cited

U.S. PATENT DOCUMENTS 11,228,624 B1 * 1/2022 Oueslati .............. H04L 65/1069
11,372,524 B1 * 6/2022 Tarpey ............... H04N 21/4826
11,418,560 B1 * 8/2022 Hinds ................... H04L 65/612
11,425,056 B1 * 8/2022 Kumar .................... H04L 45/34
11,544,441 B2 * 1/2023 Fink ...................... G06F 30/398
12,028,329 B2 * 7/2024 Zeck ..................... H04W 12/72
2005/0002413 A1 * 1/2005 Lauther ............... H04L 12/6418 370/445
2005/0261860 A1 * 11/2005 Lobig ................. H04M 3/2227 702/122
2007/0286100 A1 * 12/2007 Saaranen ............ H04L 67/1068 370/260
2008/0307054 A1 * 12/2008 Kamarthy ............. H04L 63/065 709/206
2009/0086726 A1 * 4/2009 Savage ............... H04M 7/0081 370/389
2011/0058554 A1 * 3/2011 Jain ......................... H04L 65/80 370/392
2011/0231473 A1 * 9/2011 Narayanan .............. H04L 67/56 709/224
2011/0304686 A1 * 12/2011 Qiu ........................ G06Q 10/00 348/14.08
2013/0080785 A1 * 3/2013 Ruhlen ................... H04L 67/51 713/176
2013/0172036 A1 * 7/2013 Miklos .................. H04W 8/005 455/517
2013/0205002 A1 * 8/2013 Wang ...................... H04L 69/16 709/224
2013/0254412 A1 * 9/2013 Menezes ................. H04L 51/56 709/228
2014/0136718 A1 * 5/2014 Menezes ............. H04L 47/2441 709/227
2014/0177628 A1 * 6/2014 Zhang ..................... H04L 67/51 370/352
2014/0280464 A1 * 9/2014 De Ding ................. H04L 67/56 709/203
2014/0330905 A1 * 11/2014 Kwak ................... H04W 40/10 709/204
2014/0376451 A1 * 12/2014 Sterman .............. H04L 65/1083 370/328
2015/0220995 A1 * 8/2015 Guyot ................ G06Q 30/0269 705/14.66
2015/0326469 A1 * 11/2015 Kern ....................... H04L 45/50 370/254
2016/0105453 A1 * 4/2016 Xue .................... H04L 63/1416 726/23
2016/0219024 A1 * 7/2016 Verzun ...................... H04L 9/34
2016/0285752 A1 * 9/2016 Joshi ....................... H04L 45/02
2016/0330106 A1 * 11/2016 Menezes ................. H04L 45/38
2016/0373344 A1 * 12/2016 Wohlert ................ H04L 45/302
2017/0078219 A1 * 3/2017 Connor ................. H04L 47/122
2017/0230472 A1 * 8/2017 Hasegawa ............... H04L 67/54
2018/0026733 A1 * 1/2018 Yang .................... H04N 21/235 725/33
2018/0189972 A1 * 7/2018 Humbert ................. H04W 4/02
2018/0227212 A1 * 8/2018 Ferguson .............. H04L 45/033
2018/0234342 A1 * 8/2018 Voloshin ................. H04L 45/70
2018/0278552 A1 * 9/2018 Quock ............... G06Q 20/4016
2020/0052997 A1 * 2/2020 Ramanathan ........... H04L 45/20
2020/0067828 A1 * 2/2020 Liu ..................... H04L 43/0882
2020/0092254 A1 * 3/2020 Goeringer ........... H04L 12/4641
2020/0153701 A1 * 5/2020 Mohan ................ H04L 12/2854
2021/0219220 A1 * 7/2021 Hall .................. H04W 36/0085
2021/0289371 A1 * 9/2021 Bagwell .............. H04L 65/1045
2021/0336869 A1 * 10/2021 Shen ........................ H04L 67/63
2021/0392540 A1 * 12/2021 Chong .............. H04W 28/0268
2022/0141752 A1 * 5/2022 Miao ....................... H04L 45/54 370/328
2022/0174579 A1 * 6/2022 Zhuo ....................... H04L 69/22
2022/0353195 A1 * 11/2022 Wei ....................... H04L 41/122
2022/0368625 A1 * 11/2022 Smith ...................... H04L 45/24
2023/0027647 A1 * 1/2023 Jiménez .................. H04L 67/10

* cited by examiner

900

| | 902 | 904 | 906 | 908 |
|---|---|---|---|---|
| 910 | COMMUNICATIONS ROUTE ID | SHORTEST PATH RANKING | OPTIMAL MEDIA PATH RANKING | MEDIA QUALITY METRIC SCORE |
| 912 | ROUTE 1 | 1 (PREFERRED) | 2 | 75 |
| 914 | ROUTE 2 | 2 | 1 (PREFERRED) | 85 |
| 916 | ROUTE 3 | 3 | 3 | 50 |

FIGURE 9

COMMUNICATIONS METHODS AND APPARATUS FOR DETERMINING BEST-QUALITY REALTIME-MEDIA PATH IN UNIFIED COMMUNICATIONS APPLICATIONS

RELATED APPLICATIONS

The present application is a continuation of U.S. patent application Ser. No. 17/014,745 which was filed on Sep. 8, 2020 and which published as United States Patent Application Publication Number: US 2022-0078103 A1 on Mar. 10, 2022 and which is hereby expressly incorporated by reference in its entirety.

FIELD OF INVENTION

The present invention relates to communications methods and apparatus for determining a best-quality or optimal quality Realtime-media path or route for Unified Communications applications. More particularly, the present invention relates to methods and apparatus for implementing Unified Communications (UCBot) media applications and/or agents on routers/edge-devices and the processes by which the UCBot applications and/or agents are used determining a best-quality or optimal quality Realtime-media path or route for Unified Communications applications.

BACKGROUND

In Inter-domain networks, Border Gateway Protocol (BGP) manages how to route packets through exchange of routes and reachability information across the edge-routers. In Intra-domain networks, Open Shortest Path First (OSPF) is used to determine the fastest routing path within a domain. The routes learned by both methods determine the best/shortest path between two networking elements exchanging data. This strategy may be suitable for data, but not necessarily suitable for Realtime-media (including voice/video) where quality (media Delay, Jitter, packet loss, Fidelity, one-way Delay (OWD), Roundtrip Time (RTT)) of the media is more important and not the best/shortest data path. The current method also ends up placing data and Realtime-media on the same route even though a better-quality route for media only may be present.

From the foregoing it is apparent that there is a need for a technological solution to how to determine a best-quality Realtime-media path for Unified Communications Applications. It is also apparent that there is a need for new and/or improved communications methods and apparatus for determining when the shortest data path is not an optimal or best data path based on the type of data being communicated and the importance of the quality of the data path. Furthermore, another technological problem is that the quality metrics obtained at the source of real-time media routes or paths are insufficient or less than optimal for determining best or optimal quality real-time media routes/paths between sources and destinations. As a result, there is a need for new and/or improved methods and apparatus for a source to be able to determine, measure, obtain and/or compute network edge-to-edge media quality route/path metrics that can be utilized for selecting, by the source, a best or optimal media quality route/path for a real-time media stream (as opposed to just a shortest route/path between the source and the destination.

SUMMARY

The present invention relates to communications methods and apparatus for determining a best quality or optimal quality routing path for exchanging Realtime-media between two network entities or devices. More particularly, various embodiments of the present invention relate to communications methods and apparatus for determining the best routing path for exchanging Realtime-media between two network entities such that quality parameters (e.g., media delay, Jitter, Fidelity (in voice measured by the Mean Optimum Score (MOS) score for voice and other techniques for other media), Round Trip Time (RTT)) are optimized, e.g., by meeting or exceeding thresholds set for quality and/or service assurance. Various embodiments of the present invention address and solve one or more of the technological problems discussed above.

An exemplary communications method in accordance with an embodiment of the present invention includes the steps of: receiving, at a first communications device, data of a first data communications session, said first data communications session being a first media communications session, said data being media; selecting an optimal media communications route from a plurality of communications routes between the first communications device and a second communications device; and communicating the received media of the first media communications session from the first communications device to the second communications device via the selected optimal media communications route.

In some such embodiments, the media is realtime media including audio and/or video. The first media communications session in some embodiments includes a first Real-time Transport Protocol (RTP) packet stream. In some embodiments, the step of communicating the received media of the first media communications session from the first communications device to the second communications device via the selected optimal media route includes routing packets of the first RTP packet stream from the first communications device to the second communications device via the selected optimal media route.

In some embodiments, the exemplary communications method further includes the step of establishing the first data communications session by exchanging Session Description Protocol (SDP) messages between the first communications device and the second communications device, said first communications device including information identifying the selected optimal media communications route in an SDP offer message sent to the second communications device, said SDP offer message being one of the exchanged SDP messages. In some such embodiments, the information identifying the selected optimal media communications route is included in a media attribute of SDP offer message, e.g., in an m line attribute. In some such embodiments, the information identifying the selected optimal media communications route includes an IP address and port of the first communications device to which real-time media from the second communications device is to be sent, the IP address and port corresponding to the selected optimal media communications route (e.g., where an Ethernet/DSL/Wi-Fi link has been selected as the optimal media communications route).

In some embodiments the first media communications session is one of the following a Voice Over Internet Protocol (VOIP) call session, a video call session, a conferencing call session, a collaborative session, or a whiteboarding session.

In some embodiments, the plurality of communications routes includes routes containing different transmission technologies (e.g., different physical link transmission media (Ethernet cables/lines, T1/E1/DSL cables/lines, wireless communications links), different communications interfaces, different communications protocols such as for example Ethernet, DSL, wireless 5G).

In some embodiments, the plurality of communications routes include two or more of the following types of communications routes: a wired communications route, a fiber optics communications route, and a wireless communications route.

In some embodiments, the first communications device determines that the received data of the first data communications session is real-time media (e.g., voice and/or video).

In some embodiments, the step of selecting an optimal media communications route from a plurality of communications routes between the first communications device and the second communications device includes: identifying a communications route marked as preferred for communicating media from a routing table in the first communications device including the plurality of communications routes from the first communications device to the second communications device.

In some embodiments, the plurality of communications routes between the first communications device and the second communications device is determined using the Border Gateway Protocol.

In most, but not all embodiments, the method further includes the steps of: receiving, at the first communications device, data of a second data communications session, said data of said second data communications session not being real-time media; selecting a shortest open path first route from the plurality of communications routes between the first communications device and the second communications device; and communicating the received data of the second data communications session from the first communications device to the second communications device via the selected shortest open path first route.

In some such embodiments, the first communications device determines that the received data of the first data communications session is real-time media (e.g., voice and/or video) and that the received data of the second data communications session is not real-time media.

In some embodiments of the method, prior to said selecting from a plurality of communications routes between the first communications device and a second communications device the optimal media communications route from the plurality of communications routes between the first communications device and the second communications device, the method includes the step of determining at the first communications device, by a first Unified Communication BOT (UCBot) application executing on the first communications device, the optimal media communications route from the plurality of communications routes between the first communications device and the second communications device.

In some embodiments the step of determining at the first communications device, by a first Unified Communication BOT (UCBot) application, the optimal media communications route from the plurality of communications routes between the first communications device and the second communications device includes the sub-steps of: performing a test media session on each of the plurality of communications routes between the first communications device and the second communications device; and determining from each of the performed media test sessions one or more media quality metrics for the route being tested.

In some embodiments, the step of determining at the first communications device, by a first Unified Communication BOT (UCBot) application, the optimal media communications route from the plurality of communications routes between the first communications device and the second communications device further includes the sub-steps of comparing the determined one or more media quality metrics for each of the plurality of routes between the first communications device and the second communications device; and determining the optimal media communications route based on the results of the comparisons of the determined one or more media quality metrics for each of the plurality of communications routes between the first communications device and the second communications device.

In some embodiments, prior to performing a test media session on each of the plurality of communications routes between the first communications device and the second communications device, the method includes scheduling, by the first UCBot application the test media sessions with a second UCBot application executing on the second communications device.

In some embodiments, the first communications device and the second communications device are edge devices (e.g., Session Border Controllers, edge routers, Interconnection Border Control Function Gateways, programmable edge switches, SDN edge switches) located at different edges or borders of a first network. In some such embodiments, the first communications device is located at a border with a second network and the second communications device is located at a border with a third network; and the first media communications session traverses the first network using the optimal media communications route selected by the first UCBot.

In some embodiments the method further includes the step of monitoring by the first UCBot application for an update or change (e.g., addition of a route, deletion of a route, change in preference of routes) to one or more routing table entries included in a routing table at the first communications device; said one or more routing table entries being for the plurality of communications routes between the first communications device and the second communications device. In some such embodiments, the method further includes the step of operating the first UCBot application to perform a test media session on the new route between the first communications device and the second communications device when said monitoring by the first UCBot application results in the detection of a new route between the first communications device and the second communications device.

In some embodiments the method further includes the step of monitoring by the first UCBot application for an update or change to one or more physical links. In some such embodiments, the method further includes the step of operating the first UCBot application to perform a test media session on the new route between the first communications device and the second communications device when said monitoring by the first UCBot application results in the detection of a new route between the first communications device and the second communications device.

In some embodiments, the first communications device and/or the second communications device are implemented as virtual network functions on a compute node in the cloud.

In some embodiments, the step of determining at the first communications device, by a first Unified Communication BOT (UCBot) application, the optimal media communications route from the plurality of communications routes between the first communications device and the second communications device includes: making said determination based on one or more of the one or more media quality metrics determined by the first UCBOT application for the plurality of communications routes tested.

In some embodiments, the one or more media quality metrics include one or more of the following: media delay, one-way delay (OWD), jitter, packet loss, fidelity, Mean Opinion Score, Roundtrip Time (RTT).

In some embodiments, after said first UCBot application determines at the first communications device the optimal media communications route from the plurality of communications routes between the first communications device and the second communications device, the method further includes: updating by the first UCBot application or sending by the first UCBot application a message to a network controller to update a routing table on the first communications device to include the determined optimal media communications route as the preferred route for communicating media traffic, e.g., real-time media traffic, from the first communications device to the second communications device. In some such embodiments wherein the first communications device implements a Software-Defined Networking (SDN) technology and wherein the first UCBot application sends a message to a SDN controller to update the routing table on the first communications device to include the determined optimal media communications route as the preferred route for communicating media traffic from the first communications device to the second communications device, the message includes a mapping of routes for sending/transmitting data packets including a first source IP address and port number (or port range) and a first destination IP address and port number (or port range of any).

In some embodiments, the method includes the steps of assigning, by first UCBot application, an optimal media communications route ranking to each of the plurality of communications routes from the first communications device to the second communications device, said optimal media communications route rankings being based on the results of the comparison of the media quality metrics for the tested routes, said rankings being from highest to lowest with the highest being the most optimal route and the lowest being the least optimal route; updating by the first UCBot application or sending by the first UCBot application a message to a network controller to update a routing table on the first communications device to include the optimal media communications route ranking of each of the plurality of communications routes between the first communications device and the second communications device; said determined optimal media communications route between the first communications device and the second communications device being the communications route with the highest optimal media communications route ranking which is available for communicating the media of the first media communications session.

In some embodiments, the plurality of communications routes are a set of shortest path routes between the first communications device and the second communications device. In some such embodiments, the set of shortest path routes are determined using a Border Control Gateway protocol shortest path algorithm or an Open Shortest Path First algorithm.

In many of the embodiments, the plurality of communications routes between the first communications device and the second communications device includes a first communications route and the performing a test media session on each of the plurality of communications routes between the first communications device and the second communications device includes establishing, by the first UCBot, a first test media session between the first UCBot application and a second UCBot application, said second UCBot application executing on the second communications device, said first test media session including at least one test RTP packet stream and at least one RTCP packet stream corresponding to the test RTP packet stream. In some such embodiments, the step of determining from each of the performed media test sessions one or more media quality metrics for the route being tested includes: determining a set of media quality metrics for the first communications route based on information (e.g., packet loss, jitter, one way delay, RTT) included in the RTCP packet stream corresponding to the test RPT packet stream and the content analysis of the payloads of the test RTP packet stream (e.g., MOS score based on voice media of a call session).

In some embodiments, the first UCBot application establishes said first test media session by exchanging Session Initiation Protocol messages and Session Description Protocol messages with the second UCBot application.

In some embodiments, the first UCBot application and second UCBot application are part of a dynamically formed mesh network of UCBot applications, each UCBot application of the mesh network being executed on a communication device that routes or forwards real-time media communications packets.

In various embodiments of the invention, the communications method further includes the steps of implementing, by the first UCBot application, a discovery process to discover other UCBot applications with which the first UCBot application can communicate, said discovery process including transmitting a UCBot discovery message on a multicast Internet Protocol address to other UCBot applications. In some such embodiments, the multicast IP address is a fixed multicast address registered with the Internet Assigned Numbers Authority.

In some embodiments, the UCBot discovery message includes information about the UCBot application transmitting the UCBot discovery message (e.g., UCBot version, UCBot ID (derived from UCBot's Source Internet Protocol Address), Source Internet Protocol Address, Realtime-Media capabilities (voice, video, etc.), signaling capabilities (e.g., signaling protocols supported such as Session Initiation Protocol, Session Description Protocol, H.323 protocol, RTP/SRTP protocol, RTCP protocol), local time in UTC format, UDP signaling ports, TCP signaling ports, media codecs supported, transaction-Id, shared key phrase installed or configured on the UCBot)).

In various embodiments of the invention, the method further includes the step of encrypting, by the first UCBot application, the contents of the UCBot discovery message with a shared private key prior to transmitting the UCBot discovery message.

In various embodiments, the discovery process further includes receiving, by the first UCBot application from one or more UCBot applications which received the UCBot discovery message, a UCBOT discovery response message. In some embodiments, the UCBot discovery response message is a unicast message transmitted to an IP address of the first UCBot included in the UCBOT discovery message.

In various embodiments, the UCBot discovery response message includes information about the responding UCBot application (e.g., UCBot version, UCBot ID (derived from UCBot's Source Internet Protocol Address), Source Internet Protocol Address, Realtime-Media capabilities (voice, video, etc.), signaling capabilities (e.g., signaling protocols supported such as Session Initiation Protocol, Session Description Protocol, H.323 protocol, RTP/SRTP protocol, RTCP protocol), local time in UTC format, UDP signaling ports, TCP signaling ports, media codecs supported, transaction-Id, shared key phrase installed or configured on the UCBot)). In some embodiments, the UCBot discovery response message contents include a shared key phrase installed or configured on the responding UCBot application, said shared key phrase being the same as a shared key phrase included in the contents of the transmitted discovery message: and the contents of said UCBot discovery response message is encrypted by a responding UCBot:application using the same shared private key is used to encrypt the UCBot discovery message.

Another exemplary communications method in accordance with an embodiment of the present invention includes the steps of: implementing a UCBot application or agent on each of a plurality of communications devices; each UCBot application or agent independently implementing a UCBot discovery process to discover other UCBot applications or agents with which the UCBot application or agent can communicate; executing test media sessions between the UCBot applications or agents to determine media quality metrics for each route between the source UCBot application or agent; each UCBot application or agent determining the optimal real-time media route between the communications device in which the UCBot application or agent is implemented and each of the other communications devices in which a UCBot application or agent is implemented with which the UCBot application can communicate, said optimal real-time media routes being determined based on the media quality metrics determined for each route; each UCBot application or agent updating a routing table included in the communications device in which the UCBot application or agent is implemented to include the determined optimal real-time media routes determined as the preferred routes for communicating real-time media.

In some such embodiments, the method further includes the steps of: periodically scheduling, by each UCBot application or agent, test media sessions to evaluate different paths or routes between the UCBot application or agent and each of the other UCBot applications or agents it discovered during said UCBot discovery process; performing, by the UCBot applications or agents, the scheduled test media sessions at the scheduled time; determining by each UCBot application or agent based on the performed scheduled test media sessions results whether there has been a change to any of the previously determined optimal media routes between the communications devices; and each UCBot application or agent updating the routing table included in the communications device in which the UCBot application or agent is implemented to reflect any changes determined in the optimal real-time media routes between the communications devices.

In various embodiments the method further includes: each UCBot application or agent upon detection of a new route for a communication path between the communications device in which the UCBot application or agent is implemented and another communications device in which another UCBot application or agent is implemented, executing a test media session on the route with the UCBot application or agent implemented in the another communications device to determine real-time media quality metrics for the new route as part of evaluating whether the new route is an optimal media route.

In some embodiments, the communications devices are edge devices/routers of a communications system including a plurality of networks, said edge devices and edge routers being located at the borders of the plurality of networks and interconnecting the plurality of networks. In some such embodiments, the communications system includes a plurality of different administrative domains, at least two of said plurality of different administration domains installing or configuring a private shared key and a shared phrase in said UCBot applications implemented on the edge devices and the edge routers which are part of said at least two of said plurality of different administration domains, said private shared key being used to encrypt and decrypt the content of UCBot messages, said shared phrase being included in UCBot messages to identify UCBot applications and agents which have been configured to exchange information.

The invention is also directed to systems and apparatus that are used to implement the various method embodiments of the invention. In some apparatus embodiments each of the apparatus/nodes/devices of the system include a processor and a memory, the memory including instructions which when executed by the processor control the apparatus/node/device of the system to operate to perform the steps of various method embodiments of the invention or functions ascribed to the various apparatus/node/device of the system. In some embodiments, one or more of the communications devices are virtual devices implemented on compute nodes in a cloud system wherein the compute node includes a processor and memory or is attached to a memory.

An exemplary system in accordance with an embodiment of the present invention includes: a first communications device including a first processor configured to control the first communications device to: receive data of a first data communications session, said first data communications session being a first media communications session, said data being media; select an optimal media communications route from a plurality of communications routes between the first communications device and a second communications device; and communicate the received media of the first media communications session from the first communications device to the second communications device via the selected optimal media communications route.

In some such embodiments, the first processor is further configured to control the first communications device to determine, by a first UCBot application executing on the first communications device the optimal media route from the plurality of communications routes between the first communications device and the second communications device.

In various embodiments, the first communications device is one of the following an edge device, an edge router, a session border controller, or a virtual network function node. In some embodiments, the first communications device is a device that includes a routing table of routes between the first communications device and the second communications device.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 9 illustrates an exemplary routing table in accordance with an embodiment of the present invention.

FIG. 10 comprises the combination of FIGS. 10A, 10B, 10C, 10D, 10E, 10F, and 10G.

DETAILED DESCRIPTION

Figure 1:
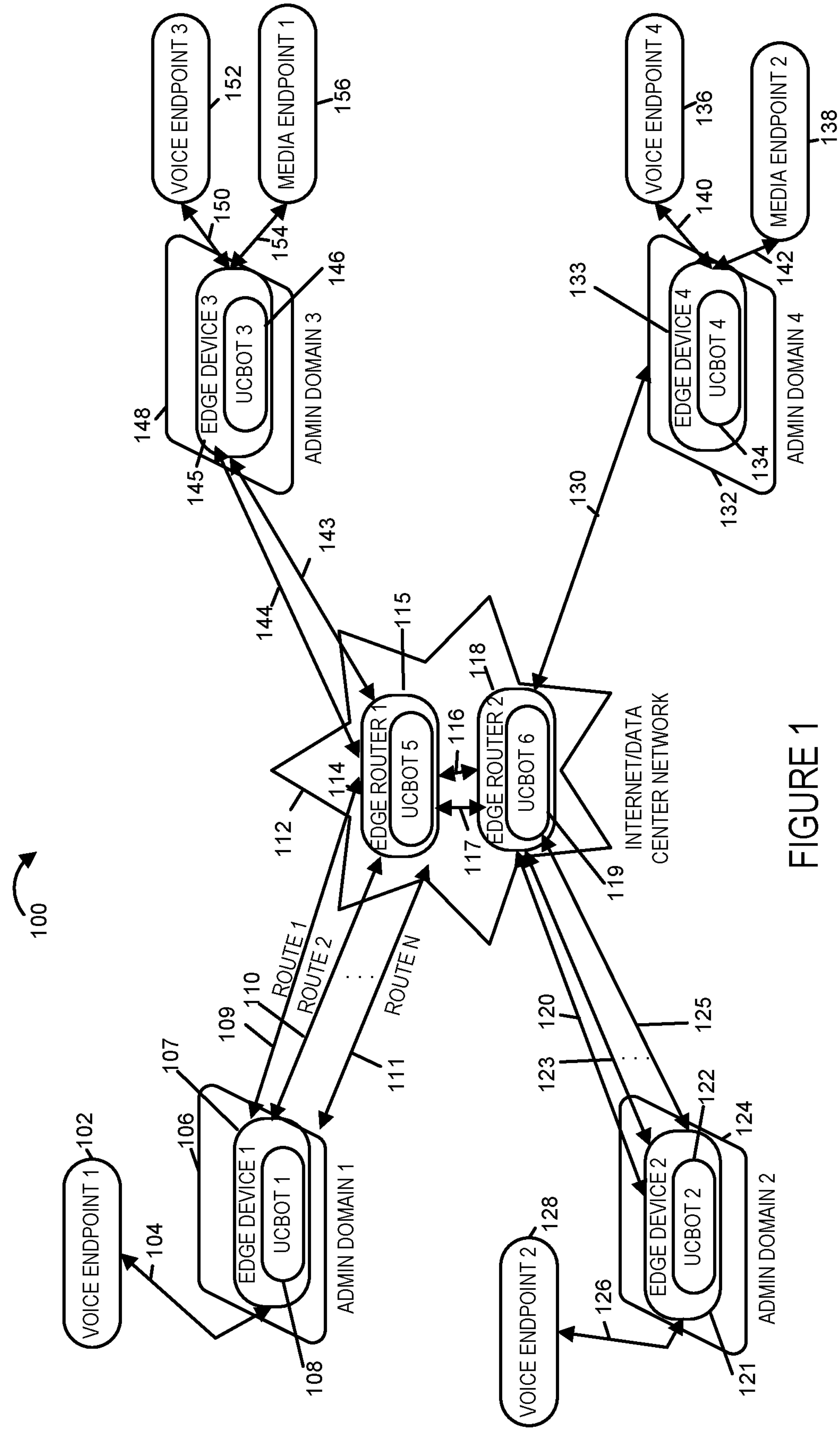
FIG. 1 is a drawing of an exemplary communications system in accordance with an exemplary embodiment.

FIG. 1 illustrates an exemplary communications system 100 in accordance with an embodiment of the present invention. Communications system 100 includes a communications network including four administration domains (Admin domain 1 106, Admin domain 2 124, Admin domain 3 148, and Admin domain 4 132), a plurality of voice endpoint devices (voice endpoint device 1 102, voice endpoint device 2 128, voice endpoint device 3 152, and voice endpoint device 4 136), a plurality of media endpoint devices (media endpoint device 1 156, media endpoint device 2 138), a plurality of edge devices (edge device 1 107, edge device 2 121, edge device 3 145, edge device 4 133, and an Internet/Data Center Network 112. One or more of the four administration domains may be, and in some embodiments are, enterprise domains owned, operated, administered and/or corresponding to different enterprise businesses. Each of the administration (admin) domains including at least one edge device including message routing functionality. Each edge device of the communications system 100 includes a Unified Communications BOT (UCBOT) which is an autonomous program of the communications system that can interact with computer systems and/or users. The Internet/Data Center Network 112 includes edge router 5 114 and edge router 6 118.

The system 100 including communications links 104, 126, 109, 110, 111, 120, 123, 125, 116, 117, 114, 130, 150, 154, 140, 142, 143, 144 coupling the various elements of the system 100 so that the various elements can exchange data, media and communications. Communications links 109, 110, . . . , 111 couple edge device 1 107 to edge router 1 115. Communications routes 1, 2, . . . , N correspond to communications links 109, 110, . . . , 111 respectively. Each of the communications links may be, and in some embodiments, are implemented using different physical media, e.g., fiber optic cable(s), wired cables and/or wireless connections and/or different communications protocols, e.g., wireless 4G/5G, Ethernet, T1/E1/DSL, etc. While the communications links are shown as a single connection link each link may be, and in some embodiments is, actually comprised of a plurality of cables and devices, e.g., repeaters, which form the link. While single link connections have been shown for sake of simplicity in FIG. 1, it should be understood that multiple link routes, paths and connections are within the scope of the invention.

In the exemplary communications system 100, the voice endpoint device 102 is coupled to the edge device 1 107 located in the admin domain 1 106 via communications link 104. Voice endpoint device 128 is coupled to the edge device 2 121 located in the admin domain 2 124 via communications link 126. Voice endpoint device 3 152 is coupled to the edge device 3 145 located in admin domain 3 148 via communications link 150. Media endpoint device 156 is coupled to the edge device 3 145 located in admin domain 3 148 via communications link 154. Voice endpoint device 136 is coupled to edge device 4 133 located in admin domain 4 132 via communications link 140. Media endpoint device 138 is coupled to edge device 4 133 located in admin domain 4 via communications link 142. The communications links are wired, fiber optic or wireless communications links. The communications links are exemplary and various types of networks may be used to couple the various elements of the system 100 together allowing for the exchange of data, information and instructions between the various elements of the system.

The edge-devices may, and in some embodiments do include edge media end-point devices such as for example IP-phones, IP video conferencing devices, and edge routers in Data-center/Inter-domain networks.

Edge device 1 107 includes UCBOT 1 108. Edge device 2 121 includes UCBOT 2 122. Edge device 3 145 includes UCBOT 3 146. Edge device 4 133 includes UCBOT 4 134. Edge router 1 114 includes UCBOT 5 115. Edge router 2 118 includes UCBOT 6 119.

In the communications system 100 a mesh network of UCBOTs (Unified Communications BOT) are running, i.e. operating, on the edge-devices connected to Internet/Datacenter network 112 and also on edge devices/edge routers that form the internet/Data-center network 112. In the exemplary embodiment, the UCBOTs are user-agents capable of making calls to each other by signaling and exchanging Realtime-media and computing call quality parameters for each such call. The call quality parameters are analyzed at the sender UCBOT for each destination UCBOT to determine or arrive at the best quality media path for a given source/destination edge-device. This media path is shared by all media-endpoints behind the edge-devices. The voice endpoint devices are media endpoint devices in which the media is audio.

The UCBOTs when run, publish their identity so that other UCBOTs can discover them and then participate in call-quality determination task. UCBOTs running at the various critical paths in data-center network can participate in the calculations along with the managed Edge devices. Each UCBOT is aware of the call-destinations of UCBOTs discovered on the system/network.

Each source UCBOT periodically indicates a desire to make a call of X-duration to a destination UCBOT discovered and upon acknowledgement from the destination UCBOT, the source UCBOT initiates a call, keeps the call running of X-period and then ends the call and computes the call quality parameters. The UCBOT runs on the edge-devices and on the Routers to compute the Realtime-media quality parameters which are then used as an input to determine the best Realtime-media quality path for a given link on the router. The tests are running periodically or on an event triggered by an indication that a network change has occurred. Once the best quality path is discovered for a given source and destination media device, UCBOTs can instruct the routing system (Software Defined Networking (SDN) and/or similar technology for example) to dynamically add preferred routes for that source/destination.

An exemplary discovery process for UCBOTs will now be discussed. The UCBot when running periodically sends a Discovery message on a fixed multicast address (registered with Internet Assigned Number Authority (IANA)) on port 9898 or an IANA registered port with a Hello message. Using a Multicast address in Internetwork control block e.g., (224.0.1.0/24). Addresses in the range 224.0.1.0 to 224.0.1.255 are individually assigned by IANA and designated as the internetwork control block. This block of addresses is used for traffic that must be routed through the public Internet. Addresses in range 224.0.1.189-224.0.1.255 are currently unassigned. A vendor or operating company registers an address e.g., 224.0.1.189 with IANA and then uses the registered address for discovery. The contents of an exemplary Hello message (i.e., discovery message) includes the following parameters/information:

1. UCBot version
2. UCBot ID (e.g., derived from or based on its SourceIP)
3. Source Internet Protocol (IP) address
4. Realtime-Media capabilities (voice, video etc.)
5. Signaling capability
6. Local time in UTC (i.e., coordinated universal time)
7. User Data Protocol (UDP) Signaling ports (comma separated list of ports)
8. Transmission Control Protocol (TCP) Signaling ports (comma separated list of ports)
9. Media codecs supported
10. Transaction-Id (Locally generated Unique ID)
11. Shared key phrase installed and/or configured on UCBot (e.g., a fixed phrase that every UCBot is installed with).

In an exemplary embodiment to secure the HELLO message and response, UCBots are installed with a shared private key. The contents of the HELLO message are encrypted using the shared private key and then sent on the multi-cast address. The UCBot on receiving the message, decrypt it using the shared private key and then also validates the shared key phrase. The Shared key phrase being a fixed phrase for an administration domain. UCBots across different Administration Domain will not discover each other unless they share the same key phase across admin domains.

In some embodiments, advanced security features are implemented for securing the HELLO message and response. For example, in some embodiments, the security procedures discussed in the Internet Engineering Task Force (IETF) Request For Comment (RFC) 3740 entitled, “The Multicast Group Security Architecture” dated Mar. 24, 2020 are implemented therein providing additional security protections. The Group Controller and Key Server (GCKS) service as proposed by the RFC 3740 may be, and in some embodiments is, implemented to provide security for the UCBot discovery process when the UCBot discovery process uses a multicast address.

The Hello Response in an exemplary embodiment is a unicast message sent to the UCBot IP address port pair of the UCBot that sent the Hello message in response to the Hello message. For example, the Hello Response may be, and in some embodiments is a unicast message sent to UCBot IP address: 9898, where the UCBot that sent the Hello message has an IP address Port pair equal to IP-A:9898. The Hello response in the exemplary embodiment contains the same fields as the Hello message filled with the responding UCBot’s details.

Figure 2:
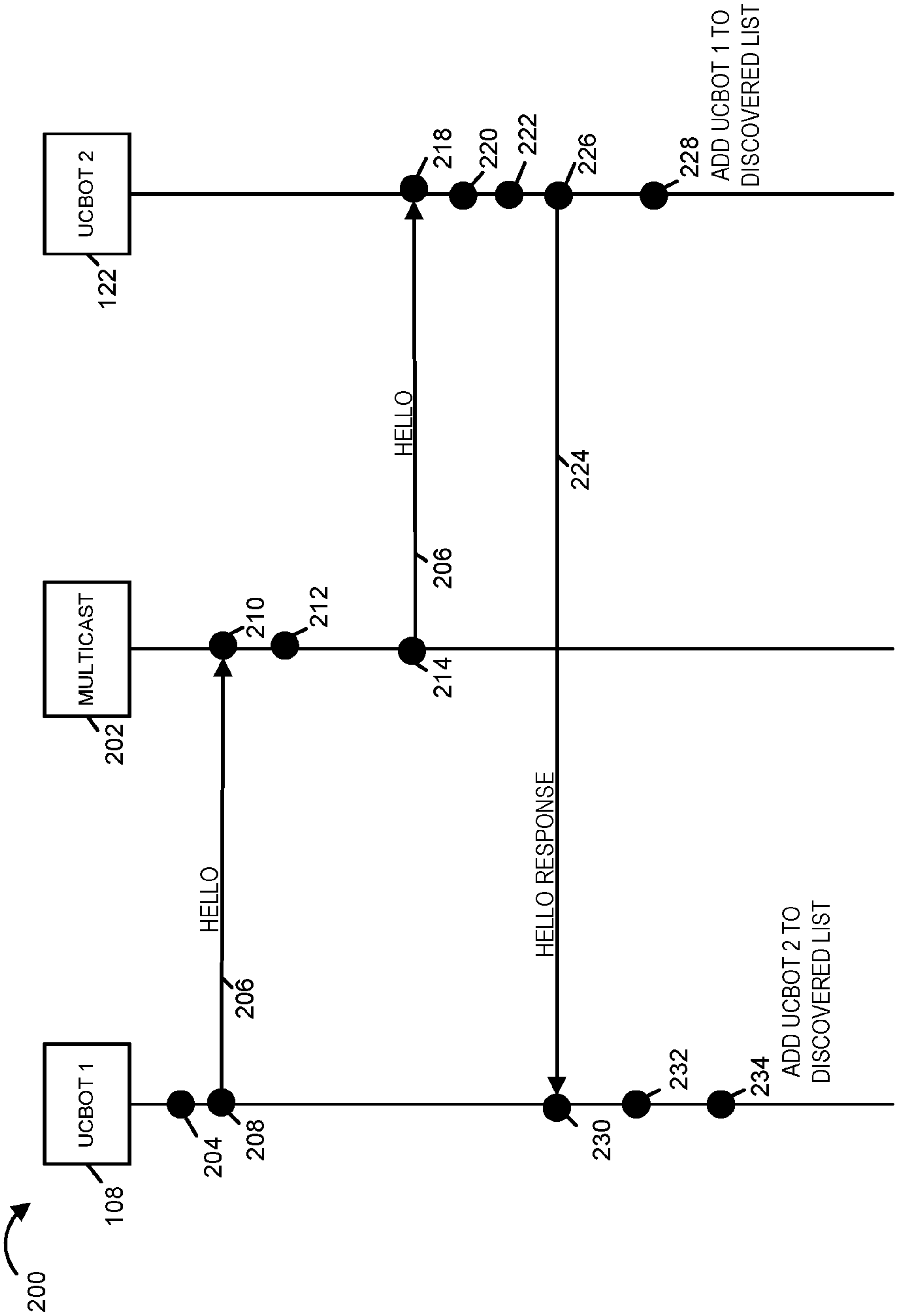
FIG. 2 is a drawing illustrating an exemplary UCBot discovery process method in accordance with an exemplary embodiment.

Method 200 of FIG. 2 illustrates an exemplary UCBot discovery process or method signaling diagram. For explanatory purposes simplified request and response messages which are the most pertinent to explaining the exemplary UCBot discovery method 200 are illustrated. As it will be appreciated additional information and formatting of the messages as well as the use of additional messages may be and typically is used in initiating and communicating among devices in networks.

Elements or steps with the same reference numbers used in different figures are the same or similar and those elements or steps will not be described in detail again.

In method 200 shown on FIG. 2, operation begins in step 204 wherein UCBot 1 108 generates discovery Hello message 206. Operation proceeds from step 204 to step 208. In step 208, the UCBot 1 108 transmits the discovery Hello message 206 on a fixed multicast address (e.g., registered with Internet Assigned Number Authority (IANA)) on port 9898 or an IANA registered port with a discovery Hello message 206 to a multicast node 202. The multicast node 202 receives the discovery Hello message 206 in step 210, processes the message 206 in step 212 and forwards the multicast discovery Hello message 206 or a Hello message based on the received message 206 to other members of the multicast group in step 214. Any one of the UCBots in the mesh network of UCBots may operate as a multicast forwarding node, e.g., UCBot 5 115 and UCBot 6 119 may each forward the message 206 until it is received by UCBot 2 122 in step 218. The discovery hello message 206 in this example includes the contents previously described above. Operation proceeds from receiving step 218 where the UCBot 2 122 receives the discovery hello message 206 to processing step 220. In step 220, the UCBot 2 122 decrypt the received discovery hello message 206 using the shared private key and then also validates the shared key phrase. The Shared key phrase being a fixed phrase which is shared by administration domain 1 106 and administration domain 2 124 and hence UCBot 2 122 is able to validate the shared key phrase. Operation proceeds from step 220 to step 222. In step 222, the UCBot 2 122 generates a discovery response message 224, e.g. a Hello response, with the same fields as the Hello message filled with the responding UCBot 2 122’s information. Operation proceeds from step 222 to steps 226 and 228. In step 222, UCBot 2 122 transmits the generated discovery Hello response message 224 as a unicast message to the UCBot 1 108’s IP address and port 9898 which UCBot 2 122 obtained from the received discovery Hello message 206. In step 228, UCBot 2 122 adds UCBot 1 108 to its discovered list, e.g., generating a record with the information for UCBot 1 108 received in the discovery Hello message 206. Operation proceeds from step 226 to step 230. In step 230, the UCBot 1 230 receives the discovery Hello response message 224 containing the information for UCBot 2 122. Operation proceeds from step 230 to step 232. In step 232, the UCBot 1 108 decrypts the received discovery hello response message 224 using the shared private key and then also validates the shared key phrase. The Shared key phrase being a fixed phrase shared across administration domain 1 106 and administration domain 2 124. As the shared key phrase is shared between the administration domain 1 106 and administration domain 2 124 the UCBot 1 108 is able to validate the shared key phrase. Operation proceeds from step 232 to step 234. In step 234, the UCBot 2 122 is added to the UCBot 1 108 discovered list, e.g., generating a record with the UCBot 2 122 information contained in the received discovery Hello response message 224.

The details of how to schedule a call in an exemplary embodiment will now be discussed. Every UBot periodically engages in Realtime-media quality determination and/or computation. Before setting up a call, both UCBOT sender and UCBOT receiver agree on the call-schedule. The reservation for a call is achieved through exchanges of messages in advance of the establishment of the call. In the exemplary embodiment CALL_SCHEDULE, CALL_RESCHEDULE, CALL_SCHEDULE_ACCEPT, CALL_SCHEDULE_REJECT messages are utilized for scheduling a call.

An exemplary CALL_SCHEDULE message contains the following information:

1. UCBot ID
2. Call-Time UTC
3. Call-Duration in minutes
4. OpenWindow (T1-T2) UTC
5. Transaction-ID
6. Shared key phrase installed on UCBot. (This is a fixed phrase that every UCBot is installed with). This is typically a fixed phrase for an administration domain. UCBots across the different Administration Domain will not schedule a call with each other unless they share the same key phase across admin domains.

An exemplary CALL_RESCHEDULE message contains the following information:

1. UCBot ID
2. Call-Time UTC (the call-time being a time different from the call-time in the call_schedule message but within the OpenWindow (T1-T2))
3. Transaction-ID (of the CALL_SCHEDULE)
4. Shared key phrase installed on UCBot. (This is a fixed phrase that every UCBot is installed with). This is typically a fixed phrase for an administration domain. UCBots across the different Administration Domain will not schedule call with each other unless they share the same key phase across admin domains.

An exemplary CALL_SCHEDULE_ACCEPT message contains the following information:

1. UCBot ID
2. Call-Time UTC (the call-time being the call time in the call_schedule message)
3. Transaction-ID (of the CALL_SCHEDULE)
4. Shared key phrase installed on UCBot. (This is a fixed phrase that every UCBot is installed with). This is typically a fixed phrase for an administration domain. UCBots across the different Administration Domain will not schedule call with each other unless they share the same key phase across admin domains.

An exemplary CALL_SCHEDULE_REJECT message contains the following information:

1. UCBot ID
2. Transaction-ID (of the CALL_SCHEDULE)
3. Shared key phrase installed on UCBot. (This is a fixed phrase that every UCBot is installed with). This is typically a fixed phrase for an administration domain. UCBots across the different Administration Domain will not schedule call with each other unless they share the same key phase across admin domains.

The CALL_SCHEDULE message and response used by UCBots for scheduling a call may be, and typically are, secured using a shared private key installed in or configured on the UCBots, e.g., the same shared private key installed for use with Hello messages as previously described. The Contents of the CALL-SCHEDULE message is encrypted using the shared private key and then sent on the uni-cast address. The UCBot on receiving the message, decrypts it using the shared private key and then also validates the shared key phrase.

Figure 3:
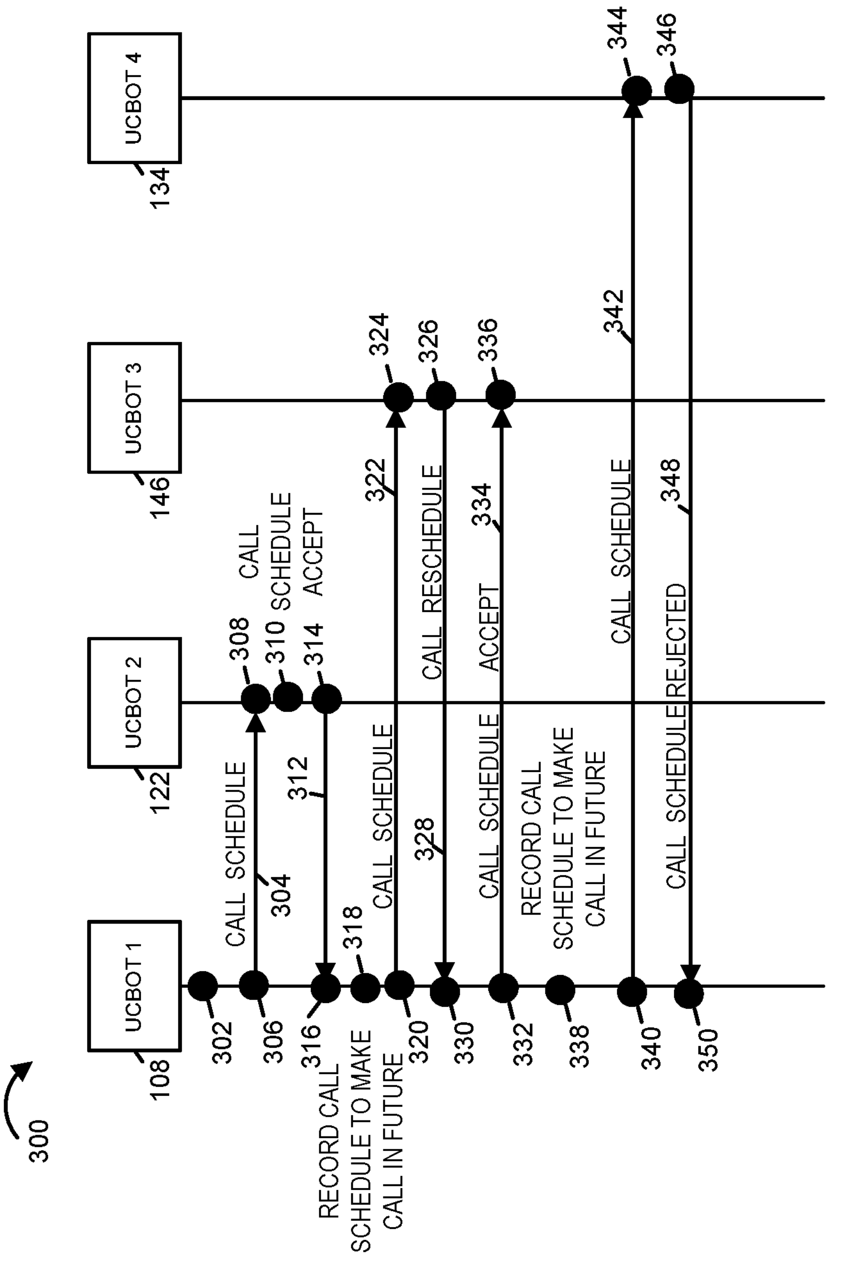
FIG. 3 is a drawing illustrating an exemplary signaling diagram illustrating various scenarios in which a UCBot schedules or attempts to schedule a test media session/call session with another UCBot in an embodiment of the present invention.

Exemplary method 300 of FIG. 3 illustrates a signaling diagram showing a variety of different exemplary UCBot test call scheduling scenarios. The test calls are one type of test media sessions. For explanatory purposes simplified request and response messages which are the most pertinent to explaining the exemplary UCBot method 300 are illustrated. As it will be appreciated additional information and formatting of the messages as well as the use of additional messages may be and typically is used in initiating and communicating among devices in networks. The method 300 begins in step 302. Steps 302 to 318 illustrate a scenario in which UCBot 1 108 proposed a scheduled call at a time and for a duration which is accepted by the destination UCBot 2 122. This test call scheduling scenario begins in step 302 with UCBot 1 108 generating call schedule message 304. The call schedule message includes the information discussed above in connection with the exemplary call schedule message including the scheduling UCBot's ID, Call-Time for the call being scheduled, call duration for the call being scheduled, open window during which the call can be rescheduled, a transaction-id and a shared key phrase installed or configured on UCBot 1 108. UCBot 1 108 also encrypts the contents of the UCBot call schedule message 304. Operation proceeds from step 302 to step 306.

In step 306, UCBot 1 108 transmits the call schedule message 304 to the UCBot 2 122. Operation proceeds from step 306 to step 308.

In step 308, UCBot 2 122 receives the call schedule message 304. Operation proceeds from step 308 to step 310.

In step 310, UCBot 2 122 processes the call schedule message 304 and determines that it will respond by accepting the call to be scheduled as it is available at the call schedule time and for the duration in the call schedule message 304. UCBot 2 122 also records the schedule for the call to prevent scheduling other calls at the same time. Operation proceeds from step 310 to step 314.

In step 314, the UCBot 2 generates UCBot Call_Schedule_Accept message 312 including the UCBot ID, call-time for the scheduled call from the call schedule message, the transaction-id included in the call schedule message 304 and the shared key phrased installed or configured on UCBot 2 122. UCBot 2 122 encrypts the contents of the UCBot Call_Schedule_Accept message. UCBot 2 122 also transmits the generated UCBot Call_Schedule_Accept message to the UCBot 1 108. Operation proceeds from step 314 to step 316.

In step 316, UCBot 1 108 receives the UCBot Call_Schedule_Accept message 312. Operation proceeds from step 316 to step 318.

In step 318, UCBot 1 108 processes UCBot Call_Schedule_Accept message and determines that the proposed test call has been accept by UCBot 2 122. UCBot 1 108 performs an operation to record call schedule to make a call at the specified call time to UCBot 2 122. In some embodiments, the UCBot 1 108 initiates a call schedule generator subroutine to initiate a call to the UCBot 2 122 at the agreed upon scheduled time.

A scenario in which the proposed call schedule is not accepted by UCBot 3 146 because UCBot 3 146 is not available at the proposed scheduled call time but is instead reschedule for a time within the time window supplied in the call schedule message received from UCBot 1 108 will now be explained. This scenario is illustrated in steps 320 to 334 of the method 300.

The scenario starts in step 320 in which UCBot 1 108 generates Call_Schedule message 322 and transmits the Call_Schedule message 322 to UCBot 3 146. The Call_Schedule message 322 includes the scheduling UCBot's ID, Call-Time for the call being scheduled, call duration for the call being scheduled, open window during which the call can be rescheduled, a transaction-id and a shared key phrase installed or configured on UCBot 1 108. UCBot 1 108 also encrypts the contents of the UCBot call schedule message 322. Operation proceeds from step 320 to step 324.

In step 324, the UCBot 3 146 receives and processes Call_Schedule message 322. UCBot 3 146 determines that it is not available at the call schedule time in the received Call_Schedule message 322 but is available within the open window during which the call can be rescheduled. Operation proceeds from step 324 to step 326.

In step 326, UCBot 3 146 generates and transmits Call_Reschedule message 328 to UCBot 1 108. The Call_Reschedule message 328 includes the UCBot ID, a call-time within the open window at which the call is being rescheduled, transaction id included in the Call_Schedule message 322, shared key phrase installed or configured on the UCBot 3 146. UCBot 3 146 also encrypts the contents of the Call_Reschedule message 328 using a shared private key which is shared with UCBot 1 108. Operation proceeds from step 326 to step 330.

In step 330, the UCBot 1 108 receives and processes the Call_Reschedule message 328. UCBot 1 108 determines that the reschedule call time is within the open window and that UCBot 1 108 is still available to make the call at the call time in the Call_Reschedule message 328. Operation proceeds from step 330 to step 332 upon UCBot 1 108 determining that it is available to make the call at the rescheduled time. In step 332, UCBot 1 generates and transmits Call_Schedule_Accept message 334 to UCBot 3 146. Call_Schedule_Accept message 334 includes UCBot Id, Call-time included in the Call_Reschedule message 328, Transaction-ID included in the Call_Reschedule message 328, and the shared key phrase installed or configured on UCBot 1 108. UCBot 1 108 also encrypts the contents of the Call_Schedule_Accept message using a shared private key that is shared between UCBot 1 108 and UCBot 3 146. Operation proceeds from step 332 to steps 336 and 338.

In step 336, UCBot 3 146 receives and processes Call_Schedule_Accept message 334. Upon processes Call_Schedule_Accept message 334, UCBot 3 determines that the reschedule call has been accepted and records in memory that it is no longer available at the rescheduled call time for the scheduled duration of the call as it scheduled to receive a call from UCBot 1 108.

In step 338, UCBot 1 108 performs an operation to record call schedule to make a call at the specified rescheduled call time to UCBot 3 146. In some embodiments, the UCBot 1 108 initiates a call schedule generator subroutine to initiate a call to the UCBot 3 146 at the agreed upon re-scheduled time.

A scenario in which the proposed call schedule is not accepted by UCBot 4 134 but is instead rejected because UCBot 4 134 is not available at the proposed scheduled call time and is also not available within the time window supplied in the call schedule message received from UCBot 1 108 will now be explained. This scenario is illustrated in steps 340 to 350 of the method 300.

The scenario starts in step 340 in which UCBot 1 108 generates Call_Schedule message 342 and transmits the Call_Schedule message 342 to UCBot 4 134. The Call_Schedule message 342 includes the scheduling UCBot's ID, Call-Time for the call attempting to be scheduled, call duration for the call attempting to be scheduled, open window during which the call can be rescheduled, a transaction-id and a shared key phrase installed or configured on UCBot 1 108. UCBot 1 108 also encrypts the contents of the UCBot call schedule message 342. Operation proceeds from step 340 to step 344.

In step 344, the UCBot 4 134 receives and processes Call_Schedule message 342. UCBot 4 134 determines that it is not available at the call schedule time in the received Call_Schedule message 342 and is also not available within the open window included in the Call-Schedule message 342 during which the call could be rescheduled. UCBot 4 134 based on unavailability determines to reject the scheduling of the call. Operation proceeds from step 344 to step 346.

In step 346, UCBot 4 134 generates and transmits Call_Schedule_Reject message 388 to UCBot 1 108. The Call_Schedule_Reject message 348 includes the UCBot ID, transaction id included in the Call_Schedule message 342, shared key phrase installed or configured on the UCBot 4 134. UCBot 4 134 also encrypts the contents of the Call_Schedule_Reject message 348 using a shared private key which is shared with UCBot 1 108. Operation proceeds from step 346 to step 350.

In step 350, the UCBot 1 108 receives and processes the Call_Schedule_Reject message 348 and determines that the attempted schedule call has been rejected and a new call scheduling attempt will need to be made at a different call time outside the open window in the Call_Schedule message 342.

Method 300 has illustrated an exemplary way of scheduling test calls between UCBots. The same method is applicable to scheduling test media sessions as test calls are a type of test media session.

How test media sessions also sometimes referred to as media calls or more generally calls are used for generating media quality metrics for different routes/paths/links between UCBots along with exemplary ways the generated media quality metrics may be, and sometimes are, used to determine the best and/or optimal media paths/routes/links between UCBots will now be discussed.

The UCBots will periodically perform media quality computations to determine the quality of media paths between the UCBots. For example, at an agreed scheduled time (i.e., call time), a UCBot will initiate a media call to destination UCBot, leave the call up for an agreed duration (i.e., call duration) and then tear down the call. During the call, the source or originating UCBot computes and/or determines delay, jitter, packet loss, MOS score (using voice call in this example) to create call-quality metrics for the destination. The source UCBot does the same call test for all links it has to reach to the destination UCBots. The best result for all the links is then retained and classified as best and/or optimal media path to the destination UCBot. The best result or optimal media path is determined based on a comparison of one or more of the determined or generated call-quality metrics for the tested links it has to reach the destination UCBots. In some embodiments, a score is determined for each path between the source UCBot and the destination UCBot and the scores are then ranked best to worst based on call-quality metrics. In some embodiments, the score for each path is generated as a weighted average of a set of call-quality metrics (or a normalized set of call-quality metrics). For example, Score for link between UCBot 1 and UCBot 5=(K1*Delay)+(K2*Jitter)+(K3*Packet Loss)+(K4*MOS score), where K1, K2, K3, and K4 are weighting factors used to weight the importance of the call quality metric in determining the path's score. In some embodiments, the weighting factors K1, K2, K3, and K4 are determined based on service contract parameters with a user of end devices or a service or network operator of a domain. For example, in some embodiments, the MOS score may be considered more important than the jitter and hence the K4 value would be higher then the K2 value. In some embodiments wherein the call or media quality metric is considered to not be relevant or data for the metric does not exist for all of the routes, the weighting factor K for that metric may be set to zero. In some embodiments, a determination is first made that each call quality metric of a path exceeds a first threshold value corresponding to the call quality metric before the path is ranked. In some such embodiments, the threshold values are values determined based on a service contract call quality metric parameters. In this way, a certain quality threshold is guaranteed for the call with respect to each call quality metric and then the overall call quality for each path is ranked based on a weighted call quality metric score as previously discussed.

In some embodiments, the optimal or best path is further based on call quality metrics from call tests which occur within a fixed period of time so that the call tests are similarly situated. For example, the results of a call test for a first path between UCBot1 and UCBot 5 will compared to the results of call tests for a second path and a third path between UCBot 1 and UCBOT 5 wherein the call tests for the first, second and third path occur within a fixed time period or window. In this way call quality metrics for a Saturday 4:00 a.m. call (low traffic non-work day call) will not be compared to a Monday 9:15 a.m. call (high traffic work day call) when the network and the paths/links will be experiencing different call loads. The fixed time period or window being selected so that the different paths are experiencing the same or similar traffic loads. In some embodiments, a source UCBot will schedule multiple test calls of the same call duration to occur simultaneously or within a fixed time period or window with a destination UCBot so that the call-quality metrics generated can be easily compared (e.g., UCBot 1 schedules and places calls on multiple paths or links to UCBot 2 at the same time or within a time period or time window during which traffic is considered to be the same or similar (e.g., calls within 5 minutes of each other). In some embodiments, the Call_Schedule message includes a set of Call-Time fields with the set including one Call-Time for each route to be tested between the sender UCBot and the destination UCBot. In this way, multiple test calls for the different routes may be scheduled to be tested within the specified open time window period. In such embodiments, the Call_Reschedule and Call_Schedule_Accept messages will include corresponding Call-Time fields as the received Call_Schedule message. Similarly, in such embodiments the Call_Schedule_Reject message will include the same Call-Time fields as the Call_Schedule message. In some embodiments, a Call_Schedule_Accept_Reject_Reschedule message is used with includes the same Call-Time fields as the Call_Schedule message with an indication of which Call-Times are being accepted, which are begin rejected and which are being re-scheduled.

Figure 4:
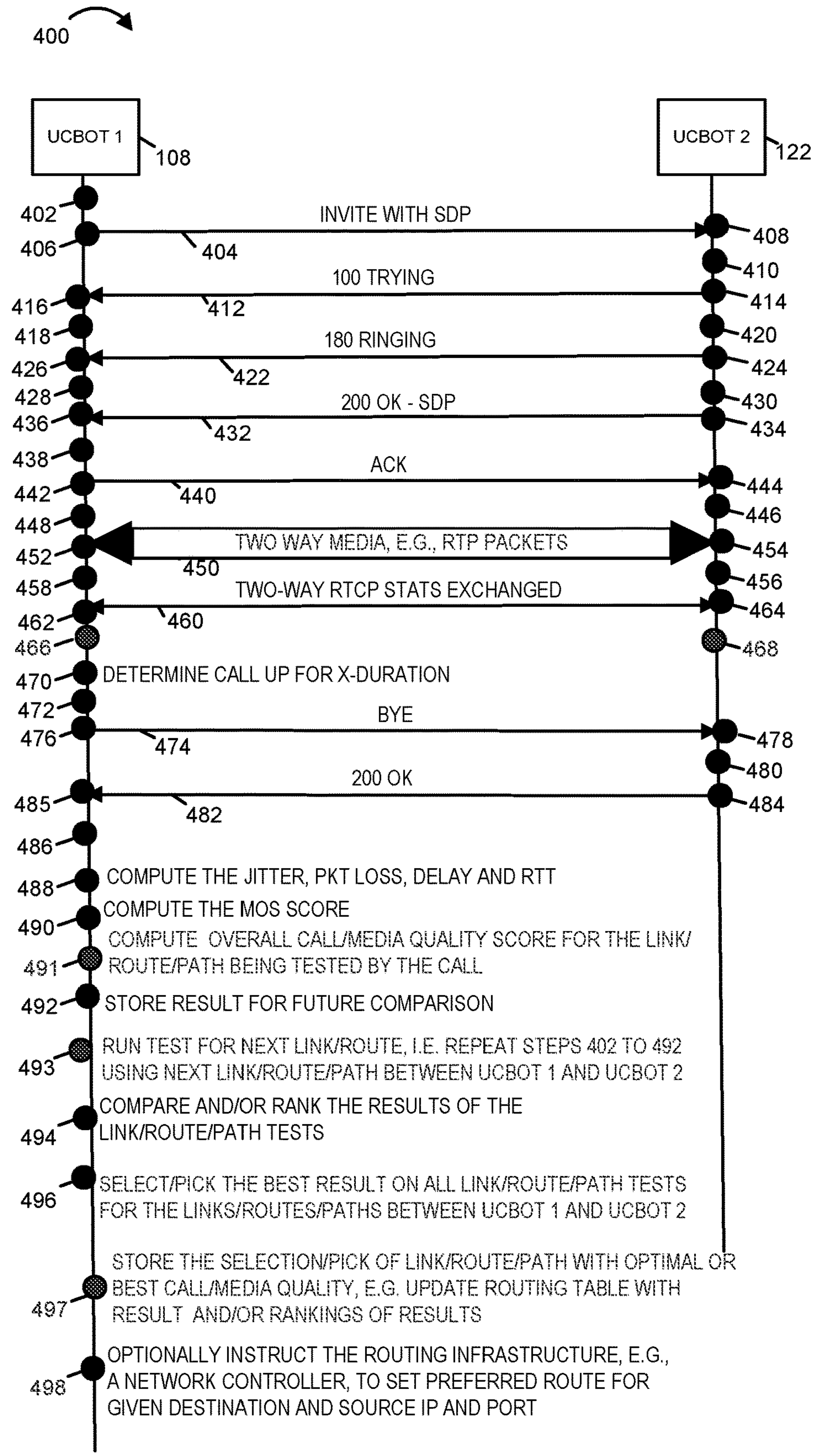
FIG. 4 illustrates an exemplary method/signaling diagram in accordance with an embodiment of the present invention.

FIG. 4 illustrates an exemplary signaling flow diagram and method 400 used to generate UCBot call quality measurements for a Session Initiation Protocol (SIP) voice call in which the UCBot also measures and/or generated voice call quality parameters. For explanatory purposes simplified request and response messages which are the most pertinent to explaining the exemplary UCBot method 300 are illustrated. As it will be appreciated additional information and formatting of the messages as well as the use of additional messages may be and typically is used in initiating and communicating among devices in networks.

Method 400 begins in step 402 wherein UCBot 1 generates SIP INVITE message 404 which includes a Session Description Protocol Offer message. The SIP INVITE message is to establish a UCBot test call or session from which call-quality metrics can be determined. In this example, the session is a voice or audio call, e.g., a Voice Over Internet Protocol call established using SIP protocol. Prior to step 402, during the UCBot discovery process, UCBot 1 discovered the signaling protocols, port, transport and codec capabilities supported by UCBot 2 and UCBot 2 discovered the signaling protocols, transport and codec capabilities supported by UCBot 1. In addition prior to step 402, the UCBot 1 to UCBot 2 test call is scheduled using one of the methods discussed herein. Operation proceeds from step 402 to step 406.

In step 406, UCBOT 1 108 transmits SIP INVITE message 404 to UCBot 2 122. Operation proceeds from step 406 to step 408.

In step 408, UCBot 2 122 receives SIP INVITE message 404. Operation proceeds from step 408 to steps 410.

In step 410, UCBot 2 122 generates SIP 100 Trying message 412 in response to the received SIP INVITE message 404. Operation proceeds from step 410 to step 414.

In step 414, UCBot 2 122 transmits the SIP 100 Trying message 412 to UCBot 1 108 in response to the SIP INVITE message 404. Operation proceeds from step 414 to steps 416 and 420.

In step 416, UCBot 1 108 receives the SIP 100 Trying message 412. Operation proceeds from step 416 to step 418. In step 418, the UCBot 1 108 processes the SIP 100 Trying message 412 and determines that the SIP INVITE message has been received at UCBot 2 122 and refrains from resending the SIP INVITE message 404 or a new SIP INVITE message to establish a call with UCBot 2 122.

In step 420, UCBot 2 122 generates SIP 180 Ringing message 422. Operation proceeds from step 420 to step 424.

In step 424 UCBot 2 transmits the SIP 180 Ringing message 422 to the UCBot 1. Operation proceeds from step 424 to steps 426 and 430.

In step 426, UCBot 1 108 receives the SIP 180 Ringing message 422. Operation proceeds from step 426 to step 428. In step 428, the UCBot 1 108 processes the SIP 180 Ringing message 422 and determines that the SIP INVITE message is still being processed at UCBot 2 122 and refrains from resending the SIP INVITE message 404 or a new SIP INVITE message to establish a call with UCBot 2 122.

In step 430, UCBot 2 122 generates SIP 200 OK message 432 in response to the SIP INVITE request message 404. SIP 200 OK message 432 includes a SDP Answer message to the SDP Offer message in the SIP INVITE message 404. Operation proceeds from step 430 to step 434. In step 434, UCBot 2 122 transmits the SIP 200 OK message 432 to UCBot 1 108. Operation proceeds from step 434 to step 436. In step 436, UCBot 1 108 receives the SIP 200 Ok message 432. Operation proceeds from step 436 to step 438. In step 438, the UCBot 1 108 processes the SIP 200 OK message 432 and the SDP Answer message included in the SIP INVITE 200 OK message 432 determining the information needed to establish the session for the test call. The SDP Offer message included in the SIP INVITE request message 404 and the SDP Answer message included in the SIP 200 OK response message 432 are a negotiation that define the session to be established for the test call and include the following information: the Session name and purpose, time(s) the session is active, the media comprising the session, and information needed to receive those media (addresses, ports, formats, etc.). In step 438, the UCBot 1 108 also generates SIP ACK message 440 which acknowledges the receipt of the SIP 200 OK message 432. Operation proceeds from step 438 to step 442 and step 448. In step 442, the UCBot 1 108 transmits the SIP ACK message 440 to UCBot 2 122. Operation proceeds from step 442 to step 444. In step 444, UCBot 2 122 receives the SIP ACK message 440. Operation proceeds from step 444 to step 446. In step 446, UCBot 2 122 processes the received SIP ACK message 440 and prepares for the exchange of media with UCBot 1 108. In step 448, UCBot 1 108 prepares for the exchange of media with UCBot 2 122. Operation proceeds from steps 446 and 448 to steps 452 and 454 where two-way media 450, e.g., media included in Real-time Transport Protocol packet messages or RTP packet flows/streams, are exchanged between UCBot 1 108 and UCBot 2 122 as part of the test call. Two-way media flows including a first media, e.g., RTP, packet flow from UCBot 1 108 to UCBot 2 122 and a second media packet flow from UCBot 2 122 to UCBot 1 108. The media may include for example pre-recorded voice and/or other audio signals so that call quality metrics, e.g., a MOS score, can be generated from the exchanged media.

In step 458, UCBot 1 108 generates Real-time Transport Control Protocol (RTCP) packets for transmission to UCBot 2 122. In step 456, UCBot 2 122 generates Real-time Transport Control Protocol packets for transmission to UCBot 1 108. In steps 462 and 464, the UCBot 1 108 and UCBot 2 122 exchange and/or communicate the generated RTCP packets to each other. The exchange of the generated RTCP packets between UCBot 1 108 and UCBot 2 122 being shown as two-way RTPC Stats 460. The exchanged RTCP packets include out of band statistics and control information for the RTP session illustrated two way media 450. The RTCP packets provide information on the quality of service (QoS) of the media communication by periodically providing statistics and information such as for example, transmitted octet and packet counts, packet loss, packet delay variation, and round-trip delay time. The statistics being generated by the UCBots 1 and 2 through monitoring and measurements of the RTP messages exchanged in steps 452 and 454 as part of RTCP packet generation steps 458 and 456 and included in the RTCP packets 460 which are exchanged in steps 462 and 464.

In step 466, UCBot 1 108 processes the RTCP packets received from UCBot 2 122 and stores the information on the quality of service (Qos), e.g., statistical information measured, generated, and/or exchanged during the call. In step 466, the UCBot 1 108 may also record audio signals for generating a MOS score for the call or may generate the MOS score in real time as media is being received. In step 468, UCBot 2 122 processes the RTCP packets received from UCBot 1 108 and stores the information on the quality of service (QoS), e.g., statistical information measured, generated, and/or exchanged during the call. In step 468, the UCBot 2 122 may also may also generate a MOS score for the call. The UCBot 2 122 may send the generated quality of service information it generated back to the UCBot 1 108, e.g., in RTCP messages included in the two-way RTCP packet message exchange 460.

In step 470, UCBot 1 108 determines that the call or media session has been up for X-duration during which media, e.g., audio signals, have been exchanged. X being a positive value, e.g., 3 minutes. When the test call has been previously scheduled, the X duration being the duration specified in the scheduling message which was used to schedule the test call. The UCBot 1 108 in some embodiments starts either a count down or count up timer when the media session or call has been established to track the duration of the call and when the test call should be terminated.

Operation proceeds from step 470 to step 472. In response to determining that the call has been up for X-duration of time which is an amount of time the call is to last, in step 472, UCBot 1 108 generates SIP BYE message 474 to terminate the call. Operation proceeds from step 472 to step 476. In step 476, UCBot 1 transmits the SIP BYE message 474 to UCBot 2 122. Operation proceeds from step 476 to step 478. In step 478, UCBot 2 122 receives the SIP BYE message 274 from UCBot 1 108. Operation proceeds from step 478 to step 480. In step 480, UCBot 2 122, processes the received SIP BYE message 474 and generates a SIP 200 OK response message 482. Operation proceeds from step 480 to step 484. In step 484, UCBot 2 122 transmits the generated SIP 200 OK response message 482 to UCBot 1 108. Operation proceeds from step 484 to step 485. In step 485, UCBot 1 108 receives and processes the SIP 200 OK message 482. Operation proceeds from step 485 to step 486. In step 486, the call is terminated, e.g., the RTP session 450 is terminated. Operation proceeds from step 486 to steps 488 and 490.

In step 488, UCBot 1 108 generates and/or computes call and/or media quality metrics from Quality of Service information, e.g., statistical and other information generated or obtained, during the test call, e.g., from the RTCP packet messages which include statistical reports. The call and/or media quality metrics include for example jitter, packet loss, delay and round trip time for the call. Whereas the statistical call metric information received in the RTCP packets are for a portion of the call's duration, the call and/or media quality metrics generated and/or computed in step 488 are for the entire call duration and are used to characterize the quality of the media session which in this example is a audio or voice call. In some embodiments, the call and/or media quality metrics are generated and updated during the call or media session as opposed to after the call or media session has completed.

In step 490, UCBot 1 108 a MOS score is generated or computed for the media communicated during the call which in this example is audio in the form of speech. In some embodiments, UCBot 1 108 generates or computes the MOS score for the call in real time as media for the call and information, e.g., statistics such as packet loss, are received.

Operation proceeds from step 488 and 490 to step 491. In step 491, an overall call and/or media quality score for the route or link tested by the test call is generated and/or computed, e.g., as a weighted average of a plurality of and/or media quality metrics including for example jitter, packet loss, delay, round-trip-time (RTT), and MOS score.

Operation proceeds from step 491 to step 492 where the results, i.e., generated call and/or media quality metrics and overall call/media quality score, are stored in memory accessible to the UCBot 1 108, e.g., in the communications device on which the UCBot 1 108 is executing. The results for this call test being stored in memory with an association of a link or route identifier to which the results correspond (e.g., in a record including a route or link identifier and the generated metrics, e.g., jitter, packet loss, delay, round trip time and MOS score, overall call/media quality score) corresponding to the route or link. In some embodiments, the endpoints of the route or link are also stored in memory in association with the link (e.g., UCBot source identification information and UCBot destination identification information). The UCBot source and destination identification information may, and in some embodiments does, include UCBot identifier, e.g., UCBot 1 and/or UCBot address, e.g., UCBot 1 IP address/port information. The results being stored for future comparison with the test results of other links and/or roots being the same UCBot source and UCBot destination which in this example are UCBot 1 and UCBot 2. In some embodiments, the test results are also stored for comparison with service contract quality of service requirements, e.g., as evidence of Quality of Service being provided at the time and date of the test call. In some embodiments, the time and date of the test call are also stored with the test results in step 492.

Operation proceeds from step 492 to step 493. In step 493, a test call for the next link, route, or path between UCBot 1 and UCBot 2 is performed with the execution of steps 402 to 492 being repeated for the next link, route or path between UCBot 1 and UCBot 2. In some embodiments, one or more subsequent test calls are performed concurrently between UCBot 1 108 and UCBot 2 122. In such embodiments, the communications devices on which the UCBots are executing have a plurality of available IP addresses and ports for performing test calls. Operation proceeds from step 493 to step 494.

In step 494, UCBot 1 108 compares and/or ranks the results of the link/route/path tests for all the links/routes/paths between UCBot 1 108 and UCBot 2 122. The ranking is typically based on the overall call/media quality score with ranking optimal or best (i.e., highest) overall call/media quality score to worst (i.e., lowest) overall call/media quality score. Operation proceeds from step 494 to step 496.

In step 496, UCBot 1 108 determines, selects and/or picks the best or optimal call/media quality result on link/route/path tests for the links/routes/paths between UCBot 1 and UCBot 2 based on the comparison of the results. In some embodiments, the overall call/media quality score generated/computed for each link/path/route are compared and link/route/path with the highest or best score is determined/selected/picked as the optimal or best call/media quality link/route/path between UCBot 1 and UCBot 2. Operation proceeds from step 496 to step 497.

In step 497, the UCBot 1 108 stores the result of the determination, selection or pick of the link/route/path between UCBot 1 108 and UCBot 2 122 with the best or optimal call/media quality. In some embodiments, in which the results are ranked the rankings are stored in memory with link/route/path information with the highest ranking link/route/path (link with highest overall call/media quality score) being determined to be the best or optimal call/media quality link/route/path. Storing the determined optimal or best call/media quality link/route/path or optimal or best call/media quality link/route/path rankings including updating or communicating a command to update a routing table in the communications device in which the UCBot 1 108 is executing to identify the determined optimal or best determined optimal or best call/media quality link/route/path or optimal or best call/media quality link/route/path rankings for future use in routing media calls between UCBot 1 and UCBot 2. In some embodiments such as for example an SDN network embodiment in which the communication device in which the UCBot 1 is executing is an SDN device, the UCBot 1 108 sends a command to the SDN network controller to update the routing table in the communications device in which the UCBot 1 108 is executing, e.g., edge device 107 in FIG. 1. Operation proceeds from step 497 to step 498.

In step 498, UCBot 1 108 optionally instructs the routing infrastructure, e.g., a network controller such as a SDN network controller in a SDN network, to set a preferred route for a given destination and source IP and port based on the determined/selected/picked best or optimal link/route/path between destination (UCBot 2 122 IP address and port and source UCBot 1 108 IP address and port). The destination and source IP and port information may, and in some embodiments, does include a range or plurality of destination and source IP addresses and/or ports corresponding to the destination and/or source. While the exemplary method 400 has been described in connection with the determination of best or optimal link/route/path between UCBot 1 108 and UCBot 2 122, the exemplary method is typically used to determine the best and/or optimal call/media quality link/route/path between UCBot 1 and each of the other UCBots that the UCBot 1 has discovered. The method is generally used by each UCBot to determine the best and/or optimal call/media quality link/route/path with every other UCBot that it has discovered. The method 300 has been described in the context of a source UCBot which UCBot 1 and a destination UCBot which is UCBot 2. The source UCBot being included in a first communications device which will choose a link/route/path to a second communications device which is a destination communications device in which the destination UCBot is located.

An exemplary embodiment of the present invention will now be discussed in which a best/optimal real-time media route is determined from a plurality of routes discovered using the Border Gateway Protocol (BGP). This exemplary embodiment illustrates how routes/paths discovered via the BGP may be tested by UCBots to determine the best/optimal real-time media routes between a UCBot source executing on a first device and a UCBot destination executing on a second device. The first and second devices including routing tables and are typically edge devices such as edge routing devices.

In this exemplary embodiment, there is a network between UCBot source and UCBot destination having a plurality of different possible paths or routes, as computed best by BGP as R1, R2 and R3.

UCBot-Source→R1→UCBot-Destination (Upstream)
→R2→
→R3→

On AS-PATH updates, as BGP is discovering new routing paths, the new routing paths are updated in the RIB (Route information Base) and next best path in the routing table. Route R1 in this example.

1. UCBot best path detection algorithm running on edge-device/router for each Egress interface will find all possible routes to a specific destination (UCBot upstream) from RIB (Route information Base (e.g., routing table or database). Route R1, Route R2, and Route R3 are possible routes to upstream UC Bot.

2. UCBot will pick each route in sequence.
3. If first route picked is say R1. UCBot will then run sample voice calls on a specific Media source and destination port as the media is negotiated in the call. UCBot will inject a specific routing rule via IP tables for given destination and source media port reaching via that route R1.
4. The test call is made one for the UDP and one for the TCP.
5. Once call matrices are computed, at the end of the call, the specific route is removed.

UCBot will then run the same steps (1-5) for routes R2 and R3.

Based on the media quality metrics (packet loss, jitter, Mean Opinion Score (MOS), One Way Delay (OWD)), if route R2 comes out to be a better path at given time, specific routing rule(s) will be added for the range of Media source ports (configurable) so that all voice calls using that media port range then are selected to follow the R2 route. UCBots also record the rule so that if in the future route R3 becomes a better path, the UCBots will not only add the rule for route R3 but will also remove the old rule for route R2.

From this point onwards, any voice call made from a device behind the Edge device/router will then follow the media path via route R2.

The detection of the receipt of a BGP route upgrade or update, will trigger the re-running of the above algorithm with the updated routes to UCBot upstream.

In the steps of the UCBot best route/path detection algorithm discussed above, in the case of a Software Defined Networking (SDN) enabled router, at step 3, the UCBot communicates, e.g., sends or communicates a message, to the SDN controller to insert the determined specific routing rule for an egress interface. At step 5 of the algorithm, the UCBot communicates with the SDN controller to remove the specific routing rule. The interface from the UCBot to the SDN controller may be, and in some embodiments is, a Representational State Transfer Application Programming Interface (RESTful API). In some other embodiments, the interface from the UCBot to the SDN controller is a Remote Procedure Call (RPC) mechanism.

Figure 5:
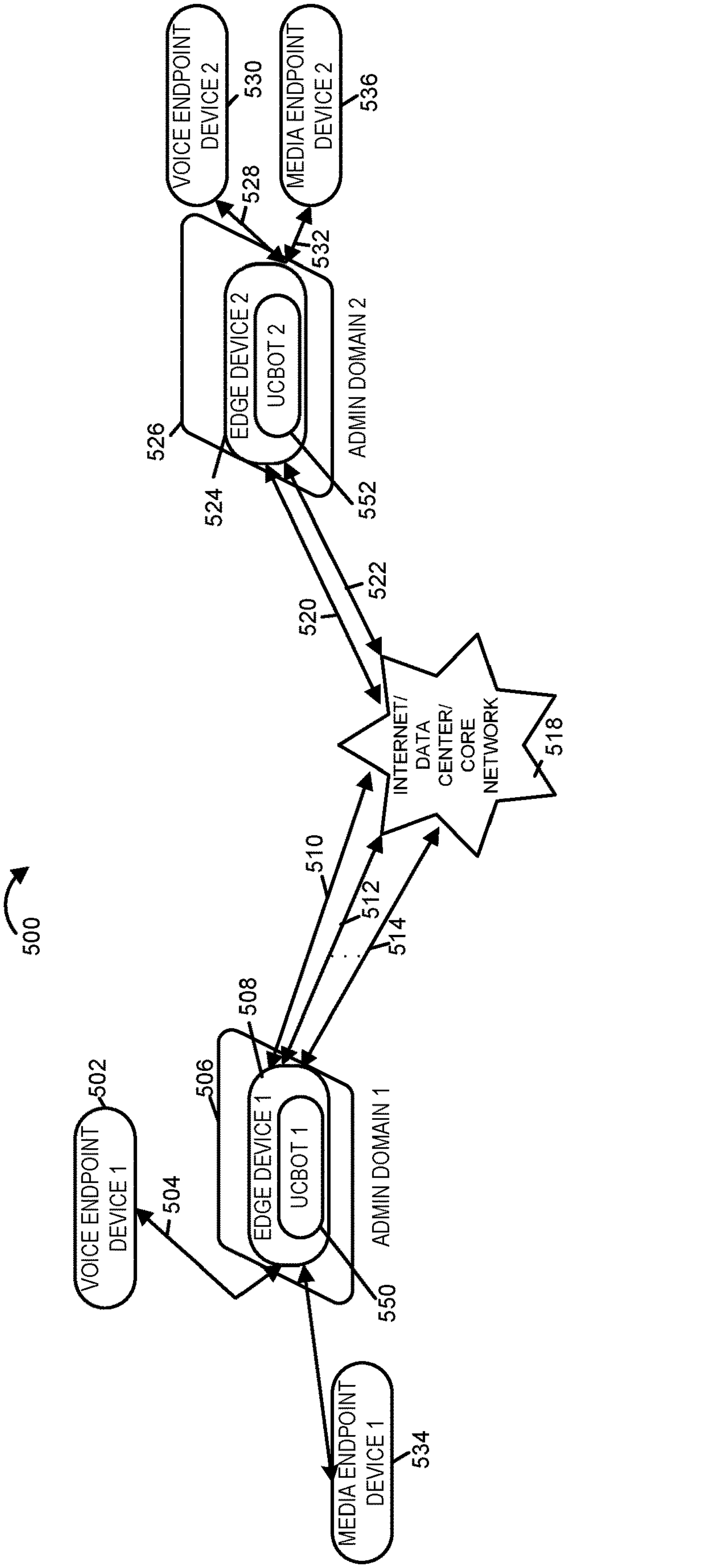
FIG. 5 illustrates another exemplary system in accordance with an embodiment of the present invention.

Another exemplary system 500 in accordance with an embodiment of the present invention is illustrated in FIG. 5. The system is a Software Defined Wide Area Network (SD-WAN) in which a best voice path determination feature using UCBots has been deployed. The system includes a plurality of endpoint devices including voice endpoint devices and media endpoint devices (voice endpoint device 1 502, media endpoint device 1 534, voice endpoint device 2 530, media endpoint device 2 536), a plurality of administration domains (admin domain 1 506 and admin domain 2 526), an Internet/Data Center Network 518, a plurality of edge devices (edge device 1 508 which is part of/located in the administration domain 1 506 and edge device 2 524 which is part of/located in the administration domain 2 526), and a plurality of communications links 510, 512, . . . , 514, 520, 522 which couple the devices of the system together and allow the devices to communicate with one another. Edge device 1 508 including a UCBot 1 550 and edge device 2 524 including a UCBot 2 552. The edge devices may be, and in some embodiments, are network routing devices such as for example edge routers, session border controllers, gateways, and virtualized network functions. The endpoint devices are for example user devices such as for example phones, mobile phones, smart phones, computers, laptops, tablets, smart televisions, etc.

The main actors/devices in the exemplary deployment are the media endpoint devices, e.g., user devices including the voice endpoint device 1 502, voice endpoint device 2 530, media endpoint device 1 534 and media endpoint device 2 534, running or operating behind an Edge device including a UCBot, multiple WAN links on Edge-Device (Ethernet, T1/E1/WAN, DSL/WAN, 4G/5G Mobile WAN) to reach to the core (Internet/Data Center/Core Network) and remote endpoints that the core network 518 help connect.

WAN links 510, 512, . . . , 514 provide connections from Edge Device 1 to the core network 518. These links carry both Real-time media along with data that is not real-time media. Similarly the links 520 and 522 provide connections from Edge Device 2 524 to the core network 518. Selecting, picking and/or determining a best link based just on through-put at the edge-device may be enough for the data traffic but not be adequate for the Real-time media traffic (e.g., voice and/or video traffic). For example, in many instances the link that has the best through-put available has serious issues or problems when trying to use that link across the core to reach to the remote media endpoint. The links 510, 512, . . . , 513 may have different physical properties, e.g., fiber optic link, wired linked, wireless link. The links 510, 512, . . . , 513 are WAN links and may be, and in some embodiments including the exemplary embodiment are Ethernet, T1/E1/WAN, DSL/WAN, 4G/5G mobile WAN links).

To address the problem, the system 500 has UCBot 1 250 running or operating on the edge-device 1 periodically run sample calls or test media sessions on all the available WAN links and gather the quality matrices (jitter, delay, loss, MOS score etc.) by communicating to UCBots on the other side of the core which in this example is UCBot 2 252 running or operating on edge device 2 526. This gives an effective health of the link status in terms of using it for communicating media. This gives an opportunity to have a SD-WAN solution, where one link is identified or picked that is best suited for the data and another link is identified or picketed that is suited best for media, e.g., real-time media, at any given time. It also provides for having a Quality Of Service (QOS) provisioning on single link with best egress-through-put for both data and media. Also it allows for the ability to select the best or optimal media route or link and the communication of media, e.g., real-time media over the route or link that is best optimized for end-to-end media communication.

A UCBot application running or operating on the Edge device helps achieve the following. (1) Proactively check, all available WAN links for best end-to-end media quality metric. (2) The periodic check may also be used to find any link failures. This may be accomplished for example, by a UCBOT that is not able to reach a UCBOT on the remote end, providing a signaling indication that the link is not available and/or the link being reported as not optimized for real-time media. (3) Proactively run some traffic analysis (e.g., a machine learned engine predicting a possible downfall of a link) to predict if the link that is currently being used for real-time media will go bad and then use that information in picking the links in order to gather the quality metric. This results in faster convergence on a best of N-links for the real-time media. (4) Creating a link status report for the best link to use at time T, so when the Edge-device in which the UCBOT is located is making an outbound call, the knowledge can be used to pick a best link to start with rather than as a fallback mechanism. (5) The link status report may, and in some embodiments does, also act as data to identify any network anomalies that might exist during a time window, e.g., a 24-hour window, for a network admin to tune the network.

Figure 6:
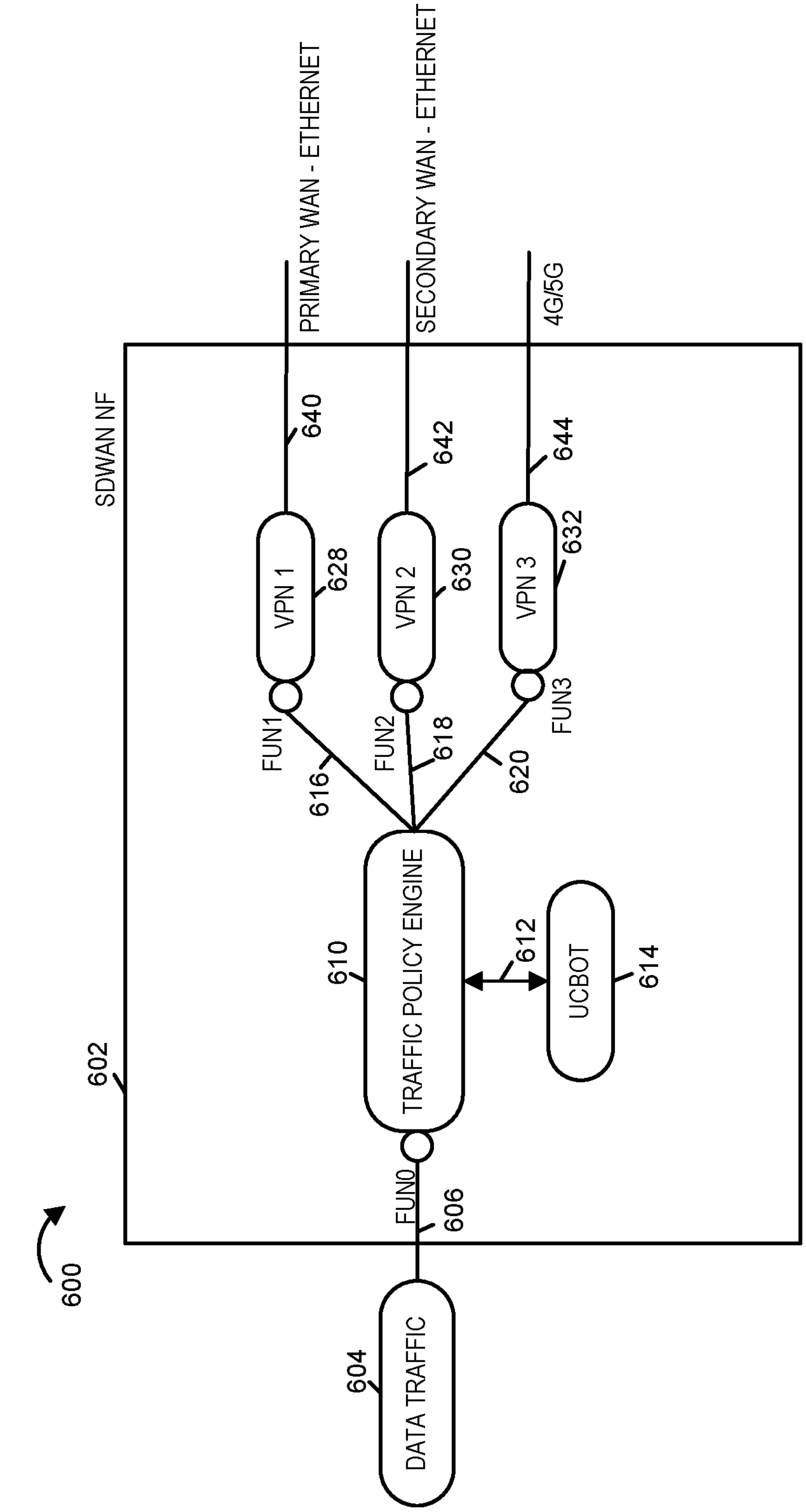
FIG. 6 illustrates a Software Defined Wide Area Network Function in accordance with an embodiment of the present invention.

Diagram 600 of FIG. 6 illustrates an exemplary deployment of a UCBot 612 along with SD-WAN feature to determine the best real-time media link of all possible physical links. The SDWAN Network function 602 in some embodiments is implemented as a virtual machine on a compute node including a processor coupled to memory. The SDWAN Network function 602 includes a traffic policy engine 610 a UCBOt 614 and a plurality of Virtual Private Network (VPN) interfaces (VPN 1 628, VPN 2 630, VPN 3 632) coupled to a plurality of VPN links (primary WAN-Ethernet VPN link 640, Secondary WAN Ethernet VPN link 642, 4G/5G VPN link 644). The UCBot 614 is running or operating as part of the SD-WAN Network Function 602, periodically running or performing voice quality tests to find the Virtual Private Network (VPN) link that provides the best or optimal real-time media metrics while also generating link quality reports for media. When determining traffic routing links, the traffic policy engine 610 will consult with the UCBot generated link quality report upon determining that the data traffic 604 to be routed is media and then chose a recommended link for the media communications. Elements 606, 612, 616, 618, and 620 represent functions, connections and/or interfaces/links for transferring and/or exchanging data and/or information among elements of the SDWAN NF 602.

In some embodiments, the edge device 1 508 in system 500 is implemented as a Network Function as described in connection with Software Defined Wide Area Network Network Function 602.

Figure 7:
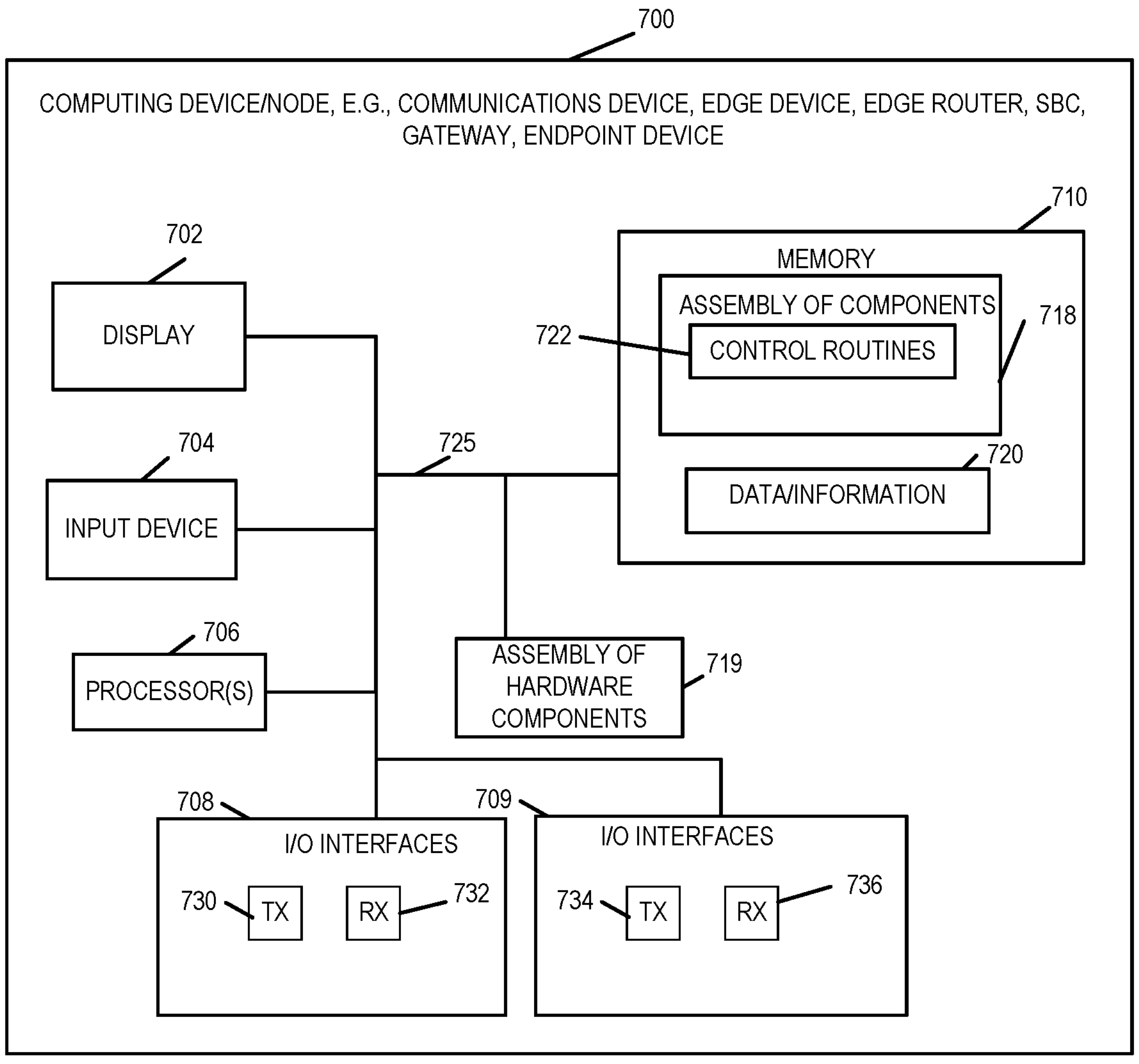
FIG. 7 illustrates an exemplary computing node/device in accordance with an embodiment of the present invention.

Exemplary computing device/node 700, e.g., communications device, edge device, edge router, Session Border Controller (SBC), Gateway, endpoint device, includes an optional display 702, an input device 704, a processor 706, e.g., a CPU, I/O interfaces 708 and 709, which couple the computing device/node 700 to networks or communications links and/or various other nodes/devices, memory 710, and an assembly of hardware components 719, e.g., circuits corresponding to different components and/or modules, coupled together via a bus 725 over which the various elements may interchange data and information. Memory 710 includes an assembly of components 718, e.g., an assembly of software components, and data/information 720. The assembly of software components 718 includes a control routines component 722 which includes software instructions which when processed and executed by processor 706 control the operation of the computing device/node 700 to perform various functions and/or one or more steps of the various method embodiments of the invention. The I/O interface 708 includes transmitters 370 and receivers 732. The I/O interface 709 includes transmitters 734 and receivers 736. The I/O interfaces are hardware interfaces including hardware circuitry. The computing device/node 700 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Session Initiation Protocol (SIP), Session Description Protocol (SDP), Internet Protocol (IP), Transport Control Protocol (TCP), H.323 protocol, User Datagram Protocol (UDP), Representative State Transfer (REST) protocol, Remote Procedure Call protocol, SQL (Structured Query Language) Protocol, Real-time Transport Protocol (RTP), Real-time Transport Control Protocol (RTCP), SRTP, SRTCP, and HDFS (Hadoop Distributed File System) Protocol, SQL and/or HDFS being used to interface and access information from various databases and/or storage devices to which it may be coupled. In some embodiments, the computing device/node 700 includes a communication component configured to operate using SIP, SDP, IP, TCP, UDP, RTP, H.323 protocol, SRTP, RTCP, SRTCP, REST, RPC, SQL (Structured Query Language), or HDFS (Hadoop Distributed File System). In some embodiments, the communications component is a hardware component, a software component or a component including hardware and software components. While only a single hardware processor is illustrated in some embodiments, it is to be understood that the computing device/node 700 can include more than one processor with the processing being distributed among the plurality of processors. In some embodiments, one or more of the following are implemented in accordance with the computing device/node 700 illustrated in FIG. 7: voice endpoint 1 102, voice endpoint 2 128, voice endpoint 3 152, voice endpoint 4 136, media endpoint 1 156, median endpoint 2 138, edge device 1 107, edge device 2 121, 3 edge device 3 145, edge device 4 133, edge router 1 115, edge router 2 118, voice endpoint device 1 502, voice endpoint device 2 530, media endpoint device 1 534, media endpoint device 2 536, edge device 1 508, edge device 2 524) illustrated in FIGS. 1 and 5.

Figure 8:
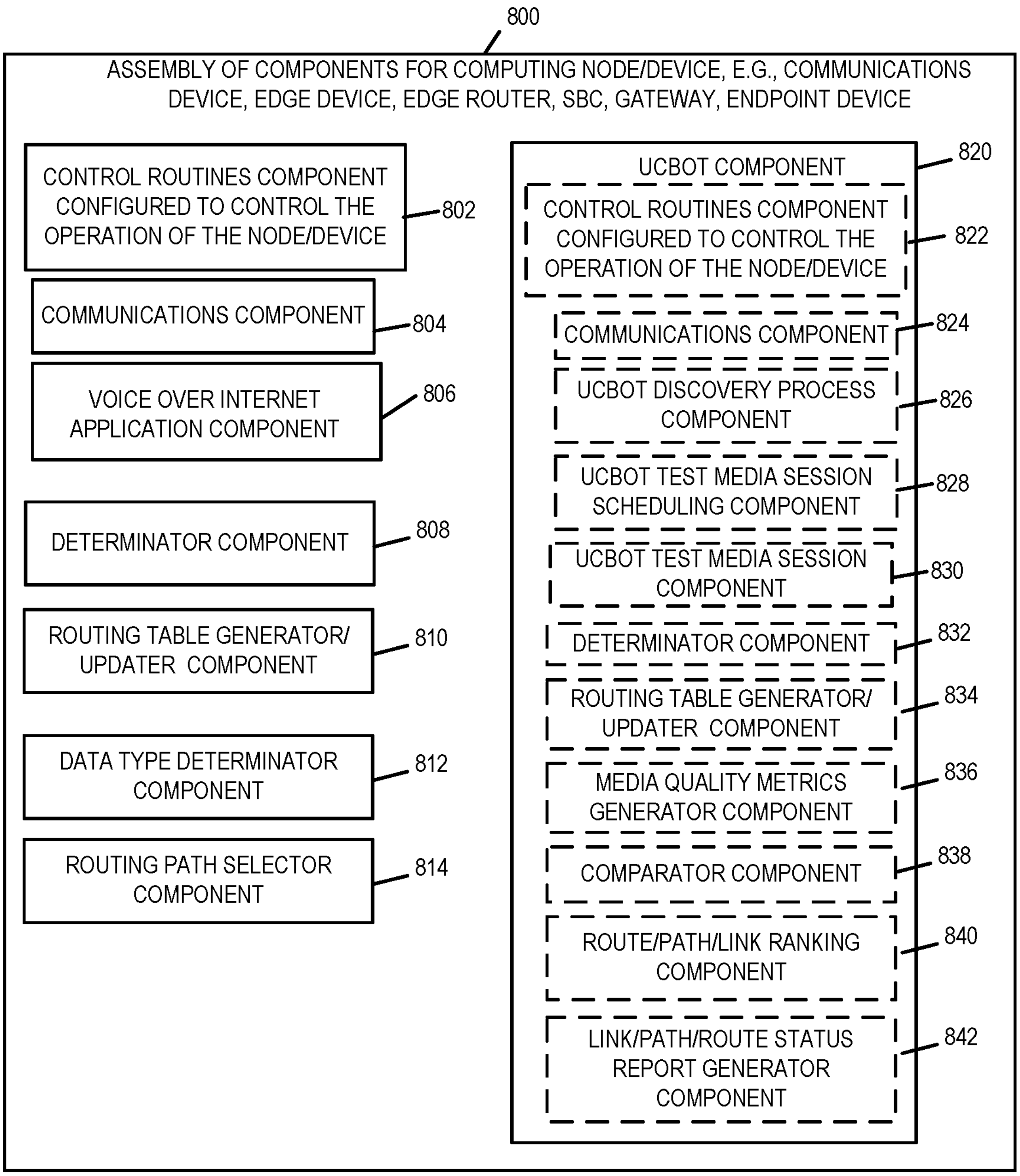
FIG. 8 illustrates an assembly of components for use in an exemplary computing device/node in accordance with an embodiment of the present invention.

An exemplary assembly of components 800 for a computing node 700 implemented as a node or device, e.g., an edge device executing a UCBot application or agent in accordance with an embodiment of the present invention is illustrated in FIG. 8. In some embodiments, the assembly of components 800 for computing node 700 is implemented as a edge device, edge router, Session Border Controller, a routing node or device or a Gateway node or device that routes real-time media data and non-real-time media data. One or more of the assembly of components 800 may be implemented as hardware components in the assembly of hardware components 719 or as software components in the assembly of software components 718 stored in memory 710 of the exemplary computing node/device 700. The assembly of components 800 will be discussed in further detail below.

FIG. 8 as discussed above is a drawing illustrating an assembly of components 800 which may be included in an exemplary communications device, e.g., endpoint device, edge device, edge router, SBC, gateway, implemented in accordance with exemplary embodiment computing device/node 700. Assembly of components 800 may be, and in some embodiments is, used in computing device/node 700. The components in the assembly of components 800 can, and in some embodiments are, implemented fully in hardware within the processor 706, e.g., as individual circuits. The components in the assembly of components 800 can, and in some embodiments are, implemented fully in hardware within the assembly of components 719, e.g., as individual circuits corresponding to the different components. In other embodiments some of the components are implemented, e.g., as circuits, within the processor 706 with other components being implemented, e.g., as circuits within assembly of components 719, external to and coupled to the processor 706. As should be appreciated the level of integration of components on the processor and/or with some components being external to the processor may be one of design choice. Alternatively, rather than being implemented as circuits, all or some of the components may be implemented in software and stored in the memory 710 of the computing device/node 700, with the components controlling operation of computing device/node 700 to implement the functions corresponding to the components when the components are executed by a processor, e.g., processor 706. In some such embodiments, the assembly of components 800 is included in the memory 710 as assembly of components 718. In still other embodiments, various components in assembly of components 800 are implemented as a combination of hardware and software, e.g., with another circuit external to the processor providing input to the processor 706 which then under software control operates to perform a portion of a component's function. While shown in the FIG. 7 embodiment as a single processor, e.g., computer, it should be appreciated that the processor 706 may be implemented as one or more processors, e.g., computers.

When implemented in software the components include code, which when executed by the processor 706, configure the processor 706 to implement the function corresponding to the component. In embodiments where the assembly of components 800 is stored in the memory 710, the memory 710 is a computer program product comprising a computer readable medium comprising code, e.g., individual code for each component, for causing at least one computer, e.g., processor 706, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the computing device/node 700 or elements therein such as the processor 706, to perform the functions of corresponding steps illustrated and/or described in the methods disclosed in FIG. 2, FIG. 3, FIG. 4 and/or described herein and/or with respect to any of the Figures. Thus the assembly of components 800 includes various components that perform functions of corresponding steps of FIGS. 2, 3, and 4.

Assembly of components 800 includes components 802, 804, 806, 808, 810, 812, 814, and 820. The control routines component 802 is configured to control the operation of the node or device. The communications component 804 is configured to provide communications functionality including communications signaling and support for various communications protocols and interfaces. The voice over internet application component 806 makes or receives voice over internet calls. The determinator component 808 makes determinations for node or device. The routing table generator/updater component 810 generates and updates routing tables for use by the computing node/device, the routing path selector component 814 selects/picks/determines a route, path or link (e.g., an optimal route pick or link) for use in communicating data, e.g., real-time media data or non-real-time media data, to other devices. UCBOT component 820 performs UCBot discovery processes, UCBOT to UCBOT communications, route characterization, route testing, generation of media quality metrics for routes, scheduling of test media sessions (e.g., test voice and video calls), determination of optimal media routes/paths/links for communicating media, e.g., real-time media between devices, generation of link/route/path status reports, ranking of route/path/links for Quality of Service for media communications based on media quality metrics, updating of routing tables to indicate rankings and/or optimal media routes/links/paths between devices. In some embodiments, the UCBOT component 820 includes one or more components 822, 824, 826, 828, 830, 832, 834, 836, 838, and 840 as sub-components.

Control routines component 822 is configured to control the operation of the node/device for implementing the UCBot functions. Communications component is configured to provide communications functionality including communications signaling and support for various communications protocols and interfaces. The communications component 822 generates messages, e.g., UCBot discovery messages, UCBot discovery response messages, UCBot test media session scheduling messages, UCBot SIP messages, UCBot SDP messages, UCBot messages to SDN network controllers. The communications component 822 also processes received messages.

UCBot discovery process component 826 is configured to implement the steps of UCBot discovery process, e.g., by exchanging UCBot discovery and discovery response messages with other UCBots and generating and updating records containing information about each discovered UCBot.

UCBot test media session scheduling component 828 is configured to schedule test media sessions use other UCBots.

UCBot test media session component 830 is configured to establish a test media session, e.g., a voice call, with another UCBot over a route to be tested/evaluated. Establishing a test media session over a route to be test/evaluated includes, in some but not all embodiments, initiating a test media session, exchanging media, e.g., real-time over the route being tested/evaluated, and terminating the test media session.

UCBot determinator component 832 is configured to make determinations for the UCBot including the determination of the optimal media route/path/link for communicating media, e.g., real-time media, between devices.

UCBot routing table generator/updater component 834 generates and updates routing tables, e.g., on the device on which the UCBot is executing.

UCBot media quality metrics generator component 836 is configured to generate media quality metrics for routes based on information obtained during test media sessions.

UCBot comparator component 838 is configured to compare data, e.g., media quality metrics data for routes.

UCBot route/path/link ranking component 840 is configured to rank routing paths/routes/links between devices based on media quality metrics.

UCBot route/path/link status report generator component 842 is configured to generate route/path/link status reports based on information obtained during test media session initiation, media exchange and determination.

Figure 10A:
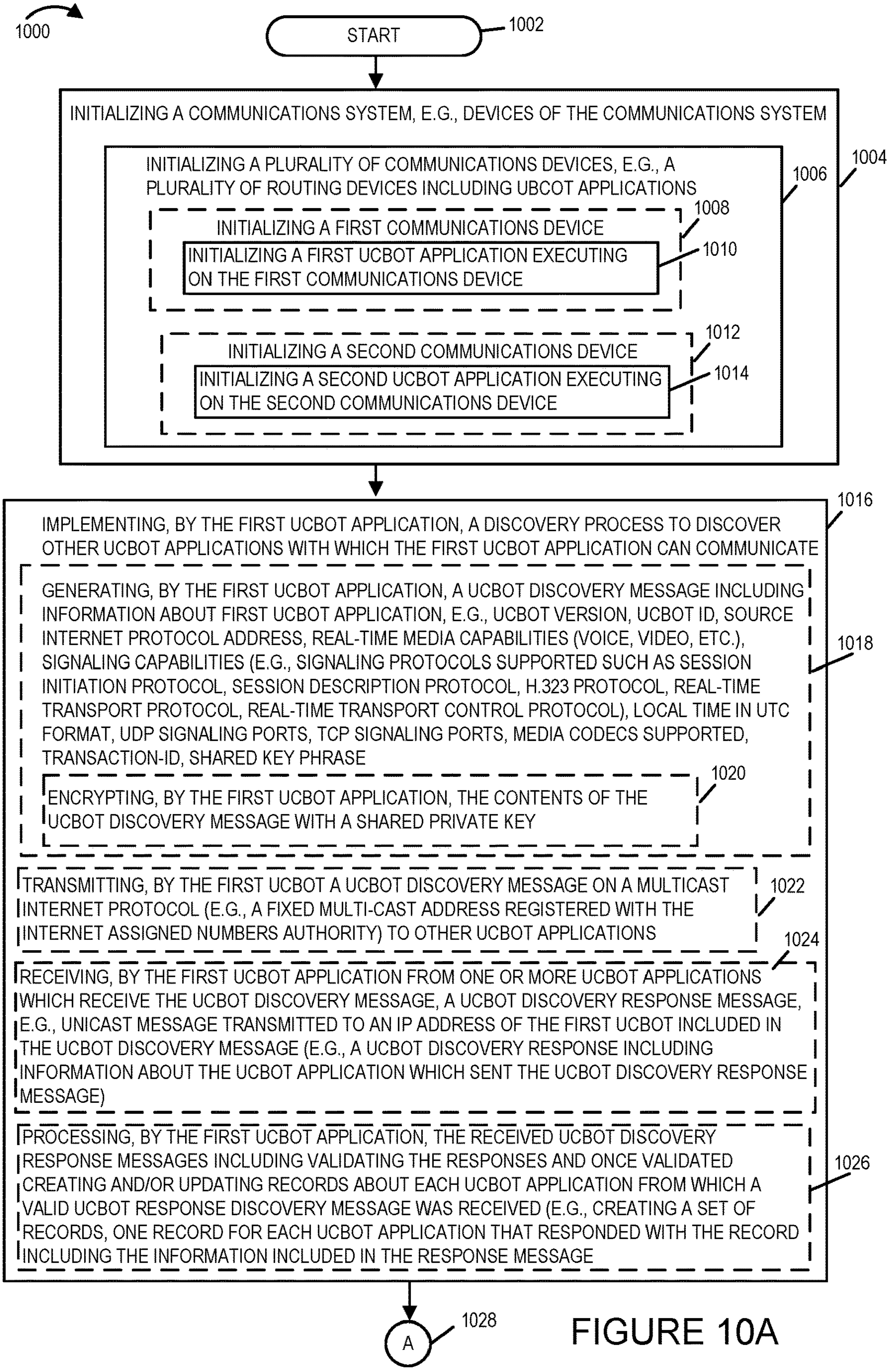
FIG. 10A illustrates a first part of an exemplary method in accordance with an embodiment of the present invention.
Figure 10B:
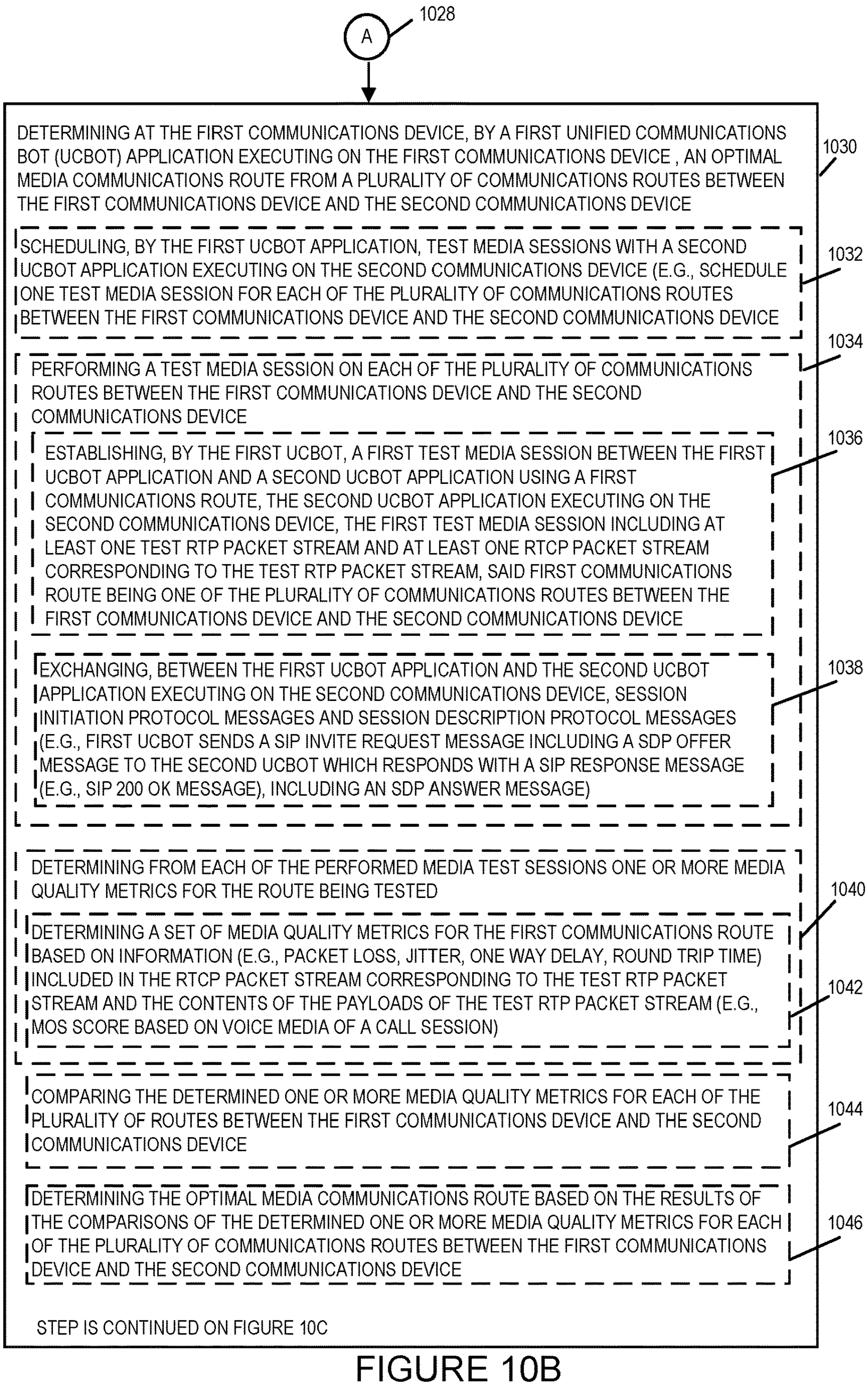
FIG. 10B illustrates a second part of an exemplary method in accordance with an embodiment of the present invention.
Figure 10C:
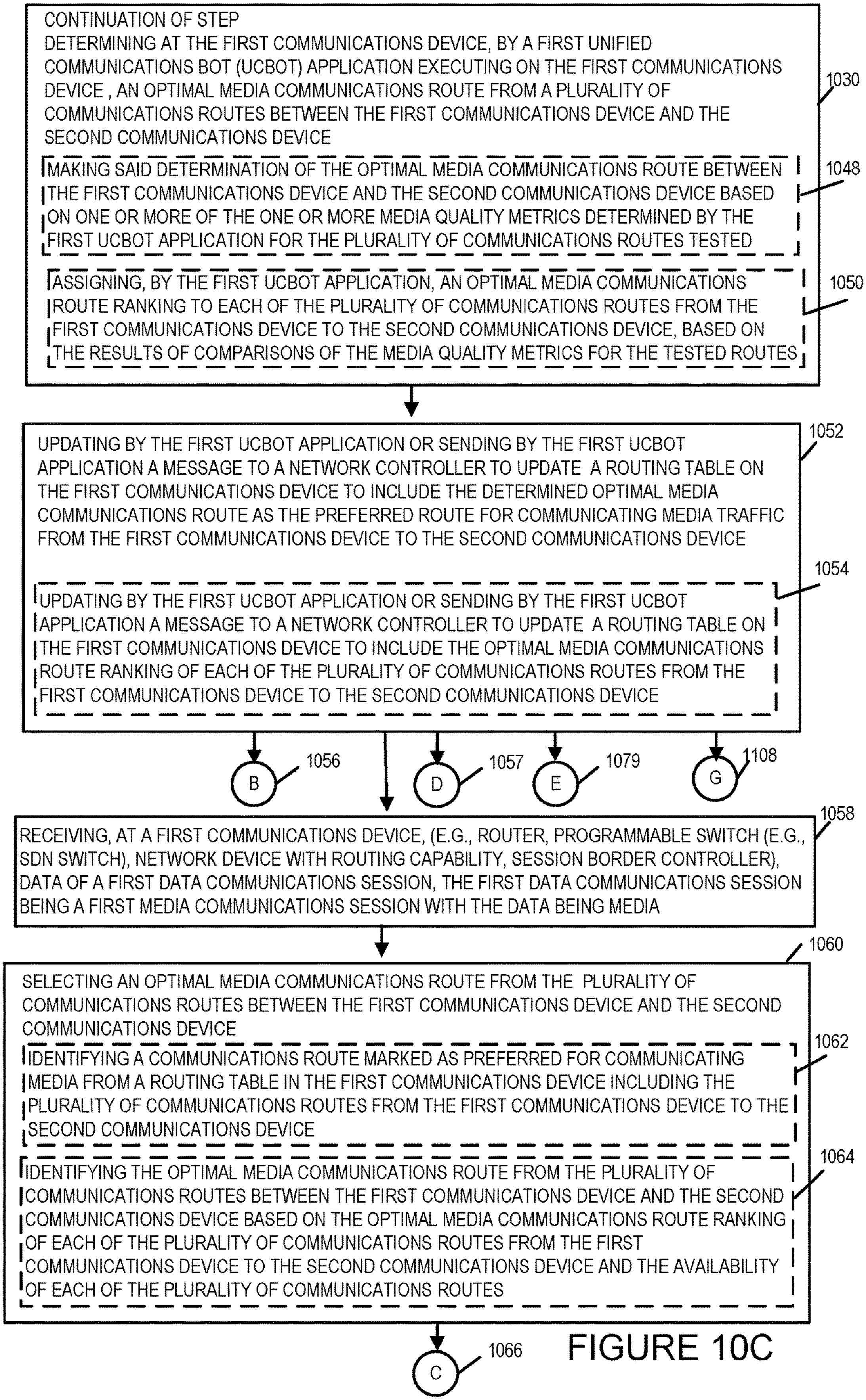
FIG. 10C illustrates a third part of an exemplary method in accordance with an embodiment of the present invention.
Figure 10D:
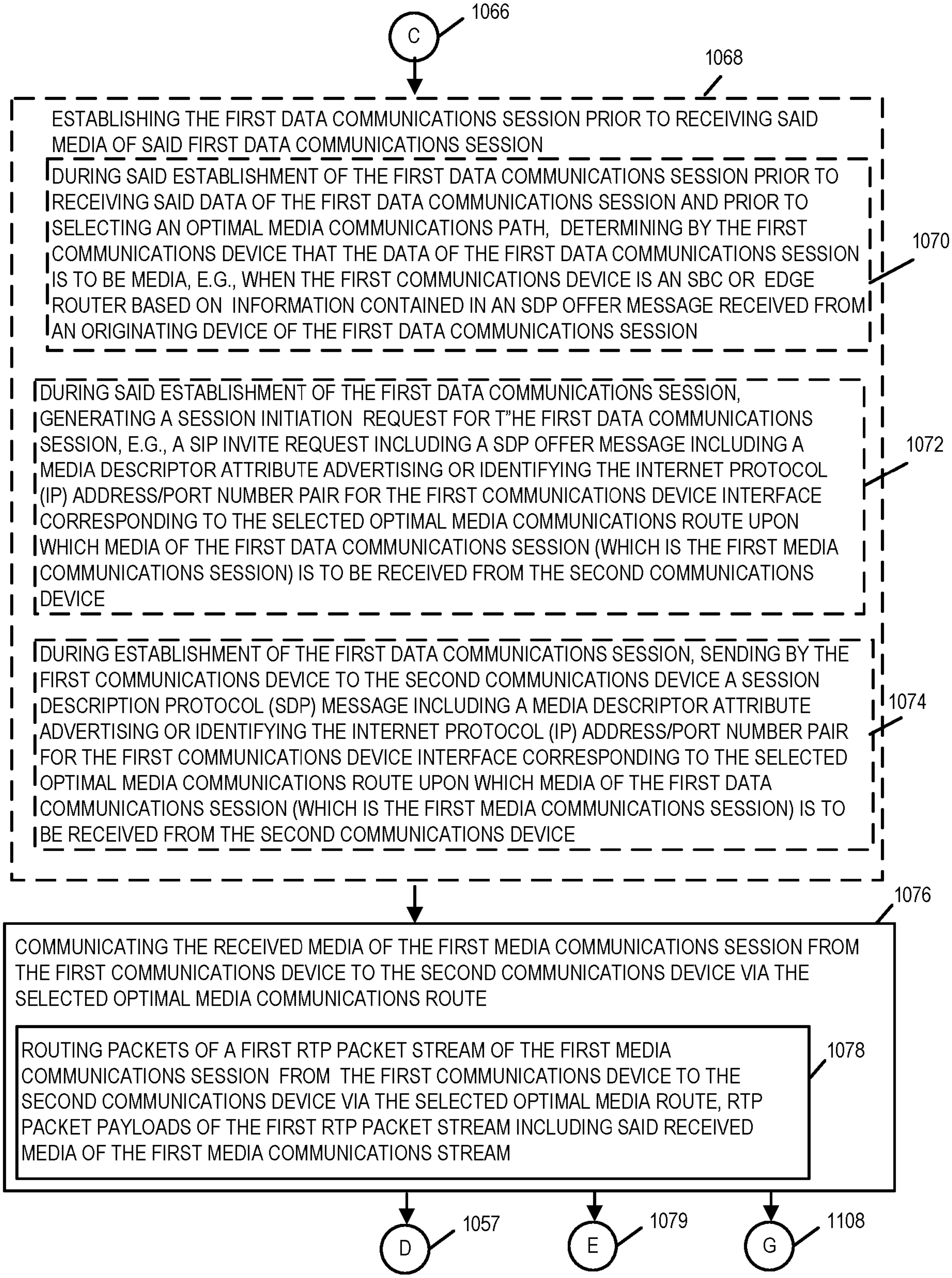
FIG. 10D illustrates a fourth part of an exemplary method in accordance with an embodiment of the present invention.
Figure 10E:
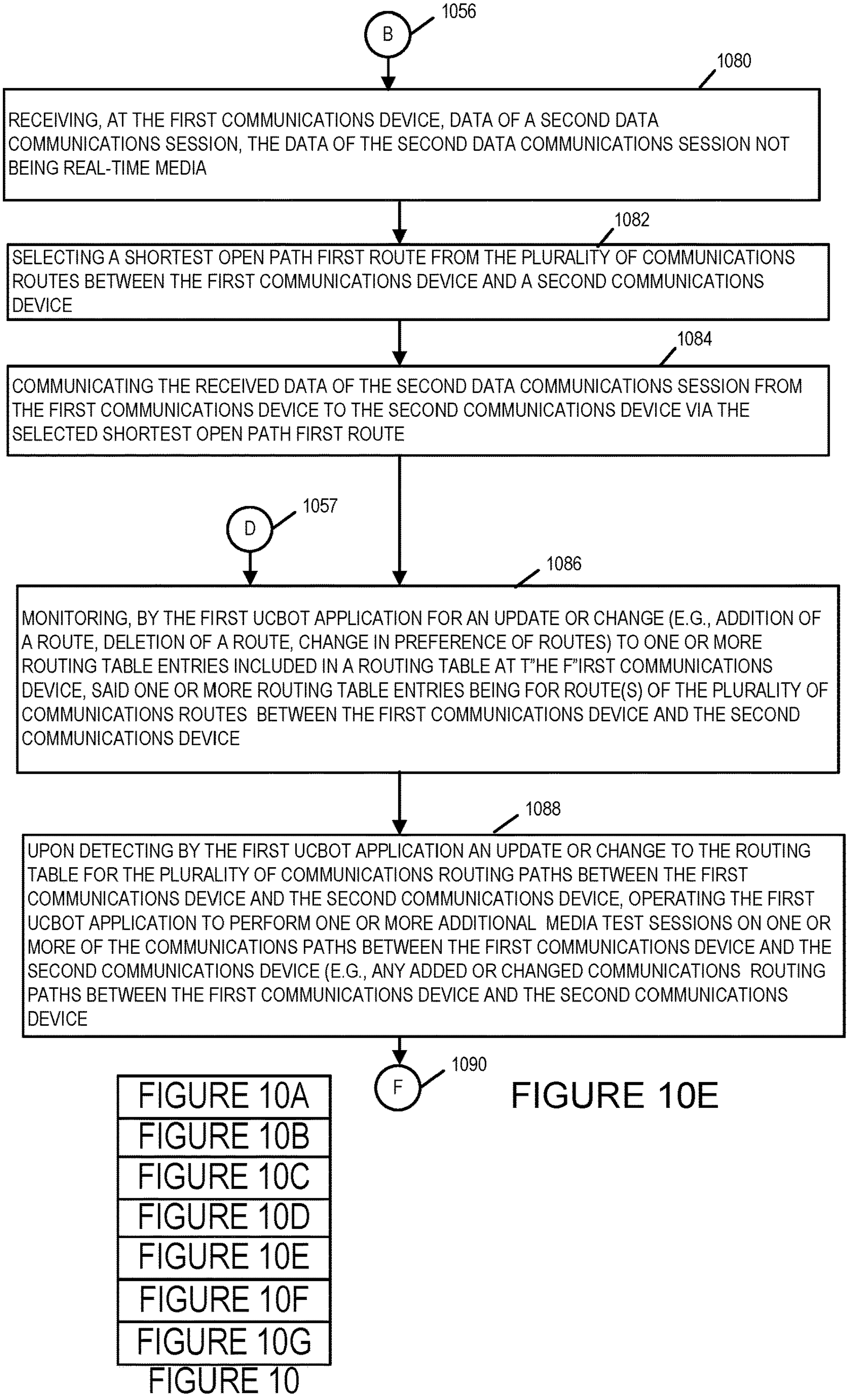
FIG. 10E illustrates a fifth part of an exemplary method in accordance with an embodiment of the present invention.
Figure 10F:
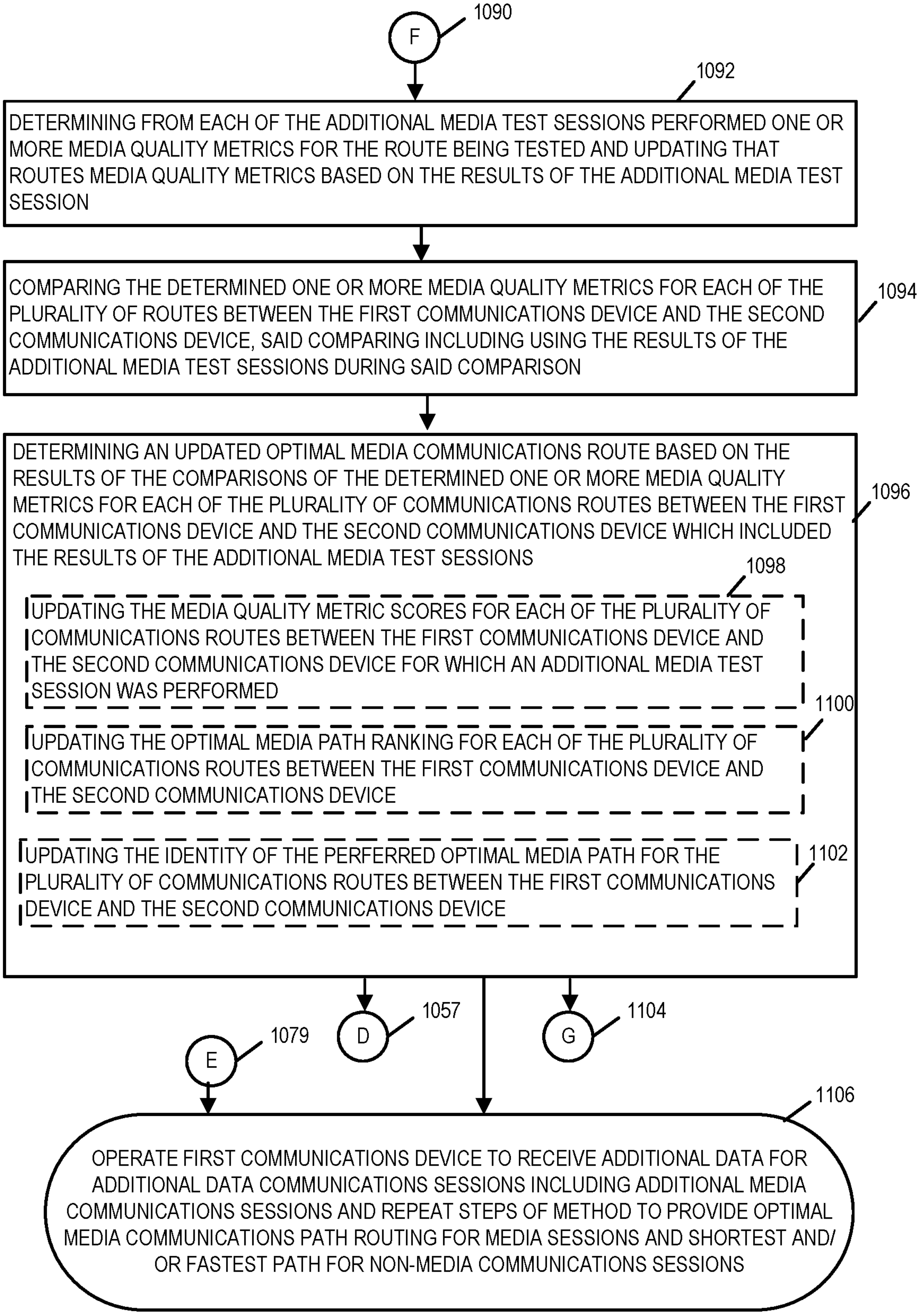
FIG. 10F illustrates a sixth part of an exemplary method in accordance with an embodiment of the present invention.

FIG. 10 comprises the combination of FIGS. 10A, 10B, 10C, 10D, 10E, 10F, and 10G. FIG. 10A illustrates a first part of an exemplary method 1000 in accordance with an embodiment of the present invention. FIG. 10B illustrates a second part of an exemplary method 1000 in accordance with an embodiment of the present invention. FIG. 10C illustrates a third part of an exemplary method 1000 in accordance with an embodiment of the present invention. FIG. 10D illustrates a fourth part of an exemplary method 1000 in accordance with an embodiment of the present invention. FIG. 10E illustrates a fifth part of an exemplary method 1000 in accordance with an embodiment of the present invention. FIG. 10F illustrates a sixth part of an exemplary method 1000 in accordance with an embodiment of the present invention. FIG. 10 G illustrates a seventh part of an exemplary method 1000 in accordance with an embodiment of the present invention. The exemplary method 1000 may be, and in some embodiments is, implemented on devices in the various exemplary systems disclosed in various Figures such as for example system 100 of FIG. 1 and system 500 of FIG. 5. It is to be understood that the communications method 1000 may be implemented on other systems and that the systems identified are only exemplary. For explanatory purposes, the method 1000 will be discussed as being implemented on exemplary system 500 illustrated in FIG. 5.

The method 1000 begins in start step 1002 shown on FIG. 10A. Operation proceeds from step 1002 to optional step 1004.

In step 1004, the communication system, e.g., communications system 100 is initialized, e.g., the devices of the communications system are initialized. Step 1004 includes sub-step 1006. In sub-step 1006, a plurality of communications devices, e.g., a plurality of routing devices including Unified Communications BOT (UCBOT) applications are initialized. In some embodiments sub-step 1006, includes sub-steps 1008 and 1012 In sub-step 1008, a first communications device, e.g., edge device 1 508, is initialized. Sub-step 1008 includes sub-step 1010. In sub-step 1010, a first UCBOT application, e.g., UCBOT 1 550, executing on the first communications device is initialized. In sub-step 1012, a second communications device, e.g., edge device 2 524, is initialized. Sub-step 1012 includes sub-step 1014. In sub-step 1014, a second UCBOT application, e.g., UCBOT 2 552, executing on the second communications device, e.g., edge device 524, is initialized. During the initialization of plurality of communications devices, routing tables are installed or established at each of the plurality of communications devices that routes messages. The first communications device establishes or has installed a routing table including shortest path first routes between the first communications device and the second communications device. The shortest path first routes being routes determined according to the Open Shortest Path First (OSPF) protocol and/or Border Gateway Protocol. In some embodiments, the system 500 is already initialized and a communications device, e.g., the first communications device, is added to the system. In such cases, only the newly added device, e.g., edge device 1 508, is initialized. In some embodiments, the first communications is updated, e.g., by installing the first UCBOT application on the first communications device. In such an example, the edge device 1, is initialized or in some embodiments only the first UCBOT 1, e.g., UCBOT 1 550, is initialized. Operation proceeds from step 1004 to step 1016.

In step 1016, the first UCBOT application, e.g., UCBOT 1 550, implements a discovery process to discover other UCBOT applications with which the first UCBOT application can communicate. In some embodiments step 1016 includes one or more sub-steps 1018, 1020, 1022, 1024, 1026.

In sub-step 1018, the first UCBOT application generates a UCBOT discovery message including information about the first UCBOT application. For example, the UCBOT discovery message may, and in some embodiments does, include one or more of the following: UCBOT version, UCBOT ID, source Internet Protocol (IP) address, real-time media capabilities (voice, video, etc.), signaling capabilities (e.g., signaling protocols supported such as Session Initiation Protocol, Session Description Protocol, H.323 protocol, Real-time Transport Protocol, Real-time Transport Control Protocol), local time in UTC format, UDP singling ports, TCP signaling ports, media codecs supported, transaction-id, shared key phrase. In some embodiments sub-step 1018 includes sub-step 1020. In some step 1020, the first UCBOT application encrypts the contents of the UCBOT discovery message with a shared private key.

In sub-step 1022, the first UCBOT application transmits UCBOT discovery message, e.g., the generated UCBOT discovery message, on a multi-cast Internet Protocol (e.g., a fixed multi-cast address registered with the Internet Assigned Numbers Authority) to other UCBOT applications.

In sub-step 1024, the first UCBOT application receives from one or more UCBOT applications which receive the UCBOT discovery message, a UCBOT discovery response message, e.g., a unicast message transmitted to an IP address of the first UCBOT included in the UCBOT discovery message. The UCBOT discovery response message including information about the UCBOT application which sent the UCBOT discovery response message. For system 500, UCBOT 2 552 would receive the UCBOT discovery message from the first UCBOT and generate and send a UCBOT discovery response message. The UCBOT discovery response message in some embodiments includes one or more of the following: UCBOT version, UCBOT ID, source Internet Protocol (IP) address, real-time media capabilities (voice, video, etc.), signaling capabilities (e.g., signaling protocols supported such as Session Initiation Protocol, Session Description Protocol, H.323 protocol, Real-time Transport Protocol, Real-time Transport Control Protocol), local time in UTC format, UDP singling ports, TCP signaling ports, media codecs supported, transaction-id, shared key phrase for the responding UCBOT, e.g., UCBOT 2 552. In some embodiments the responding UCBOT application encrypts the contents of the UCBOT discovery message with a shared private key. In this example, the first UCBOT an second UCBOT both share the private key used for encryption and also both have the same shared key phrase installed or configured on the UCBOT application, e.g., during initialization by the administers of the first admin domain 1 506 and second admin domain 2 526, allowing first UCBOT and the second UCBOT to communicate with one another.

In sub-step 1026, the first UCBOT application processes the received UCBOT discovery response message(s) which includes in some embodiments validating the responses which includes decrypting the response using the shared private key and verifying the shared key phrase. Once validated as part of the processing of the UCBOT response message(s), the creates and/or updates records about each UCBOT application from which a valid UCBOT response message was received. This entails in some embodiments creating and/or generating a set of records, e.g., one record for each UCBOT application that responded with the record including the information about the responding UCBOT included in the validated response message. Operation proceeds from step 1016 via connection node A 1028 to step 1030 shown on FIG. 10B and continued which continues onto FIG. 10C.

In step 1030, the first UBCOT application executing on the first communications device determines at the first communications device an optimal media communications route from a plurality of communications routes between the first communications device and the second communications device. Step 1030 includes one or more optional sub-steps 1032, 1034, 1040, 1044, 1046, 1048, and 1050.

In sub-step 1032, the first UCBOT application schedules test media sessions with a second UCBOT application executing on the second communications device. The second UCBOT application may be, and typically is, a UCBOT discovered during the implementation of the first UCBOT application process to discover other UCBOT applications with which the first UCBOT application can communicate.

In sub-step 1034, a test media session is performed, e.g., by the first UCBOT application, on each of the plurality of communications routes between the first communications device and the second communications device, e.g., the plurality of communications routes which are installed or configured in the first communications device during initialization. In some embodiments, sub-step 1034 includes sub-steps 1036 and 1038.

In sub-step 1036, the first UCBOT establishes a first test media session between the first UCBOT application and a second UCBOT application using a first communications route. The second UCBOT application executing on the second communications device. The first test media session including at least one test RTP packet stream and at least one RTCP packet stream corresponding to the test RTP packet stream. The first communications route is one of the plurality of communications routes between the first communications device and the second communications device.

In sub-step 1038, SIP messages and SDP messages are exchanged between the first UCBOT application and the second UCBOT application (e.g., the first UCBOT application sends a SIP INVITE request message including a SDP Offer message to establish the first media test session and the second UCBOT application responds with a SIP response message (e.g., SIP 200 Ok) including an SDP answer message.

In sub-step 1040, the first UCBOT application determines from each of the performed media test sessions one or more media quality metrics for the communications route being tested. Sub-step 1040 in some embodiments includes sub-step 1042. In sub-step 1042, the first UCBOT determines a set of media quality metrics for a first communications route based on information (e.g., packet loss, jitter, one way delay, round trip time) included in the RTCP packet stream corresponding to the test RTP packet stream and/or the contents of the payloads of the test RTP packet stream (e.g., MOS score based on voice media of a call session when the test media session is a call session). The first media test session testing the first communications route between the first UCBOT application and the second UCBOT application.

In sub-step 1044, the first UCBOT application compares the determined one or more media quality metrics for each of the plurality of routes between the first communications device and the second communications device.

In sub-step 1046, the first UCBOT application determines the optimal media communications route between the first communications device and the second communications device based on the results of the comparisons of the determined one or more media quality metrics for each of the plurality of communications routes between the first communications device and the second communications device.

In sub-step 1048 shown on FIG. 10C, the first UCBOT makes the determination of the optimal media communications route between the first communications device and the second communications device based on one or more of the one or more media quality metrics determined by the first UCBOT application for the plurality of communication routes tested.

In sub-step 1050, the first UCBOT application assigns an optimal media communications route ranking to each of the plurality of communications routes from the first communications device to the second communications device based on the results of the comparisons of the media quality metrics for the tested routes.

Figure 10G:
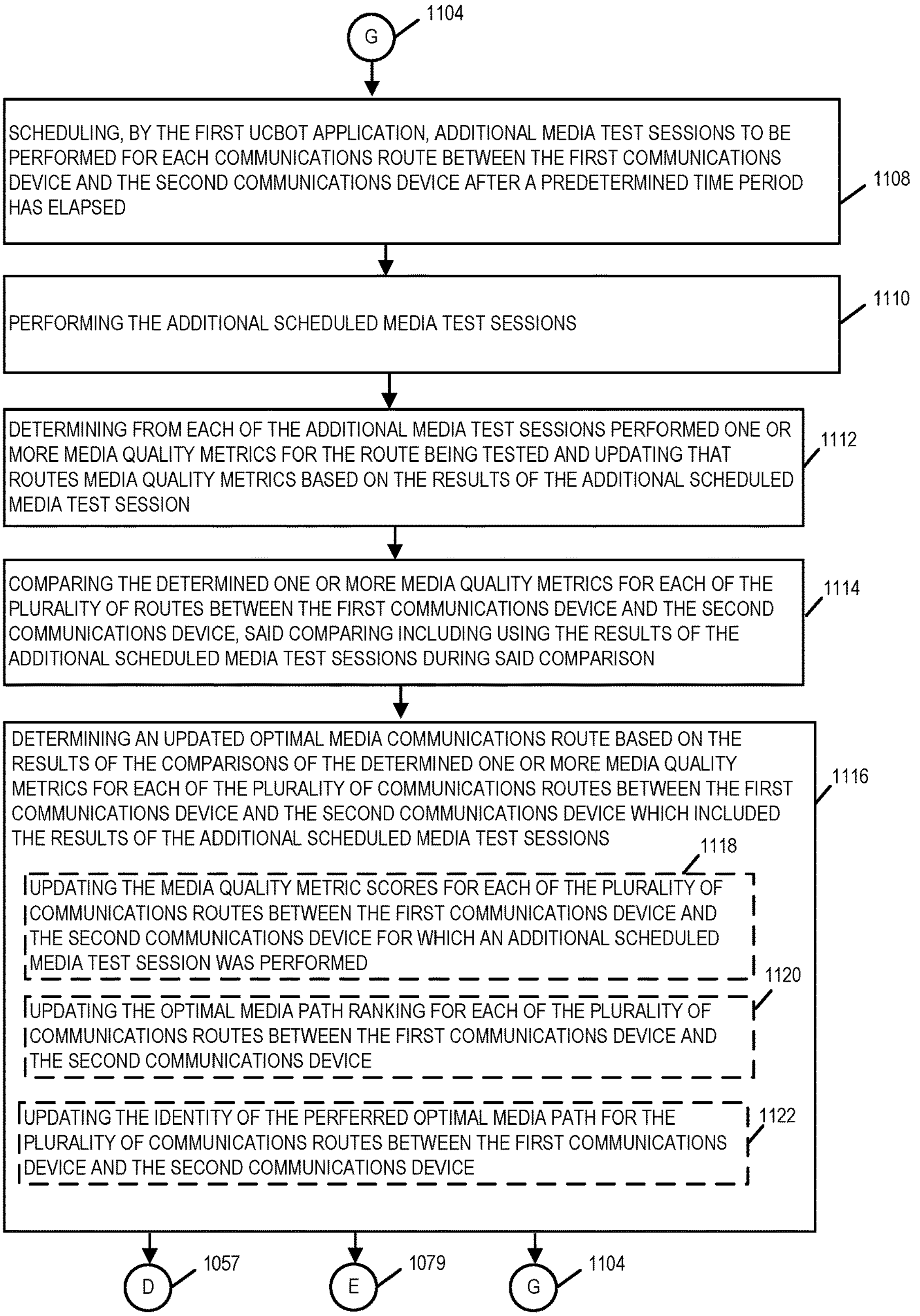
FIG. 10G illustrates a seventh part of an exemplary method in accordance with an embodiment of the present invention.

Operation proceeds from step 1030 to step 1052. In step 1052, the first UCBOT application updates or sends a message to a network controller to update a routing table on the first communications device to include the determined optimal media communications route as the preferred route for communicating media traffic, e.g., real-time media, from the first communications device to the second communications device. In some embodiments, step 1052 includes sub-step 1054. In sub-step 1054, the first UCBOT application updates or sends a message to a network controller to update a routing table on the first communications device to include the optimal media communications route ranking of each of the plurality of communications routes from the first communications device to the second communications device. Operation proceeds from step 1052 to steps 1058, 1082 shown on FIG. 10E via connection node B 1056, step 1088 shown on FIG. 10E via connection node D 1057, step 1106 shown on FIG. 10F via connection node E 1079, step 1110 shown on FIG. 10G shown via connection node G 1104.

In step 1058, data of a first data communications session is received at the first communications device. The first communications device being for example a router (e.g., edge router 1 508), programmable switch (e.g., SDN switch), network device with routing capability, Session Border Controller, or a Gateway device. The first data communications session is a first media communications session with the data being media, e.g., real-time media (e.g., audio, video, etc.). The first data session in some embodiments being from a first endpoint device (e.g., voice endpoint device 1 502) to a second endpoint device (e.g., voice endpoint device 2 530) The first endpoint device being coupled to first communications device and the second endpoint device being coupled to the second communications device. Operation proceeds from step 1058 to step 1060.

In step 1060, selecting at the first communications device an optimal media communications route from the plurality of communications routes between the first communications device and the second communications device. E.g., the first communications device may, and in some embodiments does, select the optimal media communications route based on information provided by the first UCBOT application. In some embodiments step 1060 includes one or more sub-steps 1062 and 1064.

In sub-step 1062, the first communications device identifies a communications route marked as preferred for communicating media from a routing table in the first communications device including the plurality of communications routes from the first communications device to the second communications device.

In sub-step 1064, the optimal media communications route is identified by the first communications device from the plurality of communications routes between the first communications device and the second communications device based on the optimal media communications route ranking of each of the plurality of communications routes from the first communications device to the second communications device and the availability of each of the plurality of communications routes. Operation proceeds from step 1060 via connection node 1066 to optional step 1068 shown on FIG. 10D. If optional step 1068 is not implemented than to step 1076.

Optional step 1068 includes establishing the first data communications session prior to receiving said media of the first data communications session. Optional step 1068 in some embodiments includes one or more sub-steps 1070, 1072, and 1074.

In sub-step 1070 during the establishment of the first data communications session prior to receiving the data of the first data communications session and prior to selecting an optimal media communications path or route, determining by the first communications device that the data of the first data communications session is to be media, e.g., when the first communications device is an SBC or edge router based on information contained in an SDP offer message received from an originating device (e.g., voice endpoint device 1 502) of the first data communications session.

In sub-step 1072, during said establishment of the first data communications session, generating a session initiation request for the first data communications session, e.g., a SIP INVITE request including a SDP Offer message including a media descriptor attribute advertising or identifying the Internet Protocol (IP) address/port number pair for the first communications device interface corresponding to the selected optimal media communications route upon which media of the first data communications session which is a media communications session is to be received from the second communications device.

In sub-step 1074, during the establishment of first data communications session, sending by the first communications device to the second communications device a session description protocol (SDP) message, e.g., the generated Session Description Protocol offer message) including a media descriptor attribute advertising or identifying the Internet Protocol (IP) address/port number pair for the first communications device interface corresponding to the selected optimal media communications route upon which media of the first data communications session is to be received from the second communications device. Operation proceeds from optional step 1068 to step 1076. If step 1068 is not implemented then step 1068 is skipped and operation proceeds from step 1060 to step 1076.

In step 1076, the first communications device communicates the received media of the first media communications session from the first communications device to the second communications device via the selected optimal media communications route. In some embodiments step 1076 includes sub-step 1078. In sub-step 1078, the first communications device routes packets of a first RTP packet stream of the first media communications session from the first communications device to the second communications device via the selected optimal media communications route. The RTP packet payloads of the first RTP packet stream of the first media communications session including the received media of the first media communications session. Operation proceeds from step 1076 via connection node D 1057 to step 1086 shown on FIG. 10E, to step 1106 shown on FIG. 10F via connection node E 1079, to step 1110 shown on FIG. 10G via connection node G 1104.

Returning to step 1080, in step 1080, a data of a second data communications session is received at the first communications device. The data of the second data communications session is not real-time media. Operation proceeds from step 1080 to step 1082.

In step 1082, the first communications device selects a shortest open path route first route from the plurality of communications routes between the first communications device and the second communications device. The second data communications session being originated from a first endpoint device coupled to the first communications device with a destination of a second endpoint device coupled to the second communications device. Operation proceeds from step 1082 to step 1084.

In step 1084, the first communications device communicates the received data of the second data communications from the first communications device to the second communications device via the selected shortest open path first route. In most, but not all embodiments, the selected optimal media communications route between the first communications device and the second communications is different from the selected shortest open path first route.

Returning to step 1086, in step 1086, the first UCBOT application monitors for an update and/or change (e.g., addition of a route, deletion of a route, change in preference of shortest path first route) to one or more routing table entries included in a routing table at the first communications device, the one or more routing table entries being for route(s) of the plurality of communications routes between the first communications device and the second communications device. Operation proceeds from step 1086 to step 1088.

In step 1088, the upon detecting by the first UCBOT application an update or change to the routing table for the plurality of communications routing paths between the first communications device and the second communications device, operating the first UCBOT application to perform one or more test media sessions on one or more of the communications paths between the first communications device and the second communications device, (e.g., performing a test media session on any added or changed communications routing paths between the first communications device and the second communications device). Operation proceeds from step 1088 via connection node F 1090 to step 1092 shown on FIG. 10F.

In step 1092, the first UCBOT application determines from each of the additional media test sessions performed one or more media quality metrics for the route being tested and updating that routes media quality metrics based on the results of the additional media test session. Operation proceeds from step 1092 to step 1094. In step 1094, the first UCBOT application compares the determined one or more media quality metrics for each of the plurality of routes between the first communications device and the second communications device with said comparing including using the results of the additional media test sessions during said comparison. Operation proceeds from step 1094 to step 1096.

In step 1096, the first UCBOT application determines an updated optimal media communications route based on the results of the comparisons of the determined one or more media quality metrics for each of the plurality of communications routes between the first communications device and the second communications device which included the results of the additional media test sessions. The first UCBOT application then updates the routing table of the first communications device to indicate the determined updated optimal media communications route or path as the preferred communications route for future media sessions. Operation 1097 in some embodiments includes one or more sub-steps 1098, 1100, and 1102.

In sub-step 1098, the first UCBOT application updates the media quality metric scores for each of the plurality of communications routes between the first communications device and the second communications device for which an additional media test session was performed.

In sub-step 1100, the first UCBOT application updates the optimal media path ranking for each of the plurality of communications routes between the first communications device and the second communications device.

In sub-step 1102, the first UCBOT application updates the identity of the preferred optimal media path for the plurality of communications routes between the first communications device and the second communications device.

In some embodiments for example SDN embodiments in which the first communications device is an SDN enabled device, the step 1096 and/or sub-steps 1098, 1100, and/or 1102 include sending a message to a controller to install a routing update in the first communications device, the routing update including the information updated in each of the steps and/or sub-steps being performed. Operation proceeds from step 1096 to step 1106, to step 1086 shown on FIG. 10E via connection node D 1057, and to step 1108 shown on FIG. 10G via connection node G 1104.

In returning to step 1086, the method 1000 continues with the first UCBOT application monitoring for an update or change to routing table that affects the plurality of routes between the first communications device and the second communications device.

In step 1106, the first communications device is operated to receive additional data for additional data communications sessions including additional media communications sessions and to repeat the steps of the method to provide optimal media communications path routing for media sessions, e.g., real-time media sessions, and shortest and/or fastest path routing for non-media data communications sessions.

In step 1108, the first UCBOT application schedules additional media test sessions to be performed for each communications route between the first communications device and the second communications device after a predetermined time period has elapsed. These additional scheduled media test sessions are to refresh the media quality metrics and the routes so that the optimal media communications routing information does not be stale and/or out of date. Operation proceeds from step 1108 to step 1110.

In step 1110, the first UCBOT application performs the additional schedule media test sessions. Operation proceeds from step 1110 to step 1112.

In step 1112, the first UCBOT application determines one or more media quality metrics for each of the plurality routes between the first communications device and the second communications device and updating that routes media quality metrics based on the results of the additional scheduled media test session. Operation proceeds from step 1112 to step 1114.

In step 1114, the first UCBOT application compares the determined one or more media quality metrics for each of the plurality of communications routes between the first communications device and the second communications device, said comparing including using the results of the additional scheduled media test sessions performed during said comparison. Operation proceeds from step 1114 to step 1116.

In step 1116, the first UCBOT application determines an updated optimal media communications route based on the results of the comparisons of the determined one or more media quality metrics for each of the plurality of communications routes between the first communications device and the second communications device which included the results of the additional scheduled media test sessions. The first UCBOT application then updates the routing table of the first communications device to indicate the determined updated optimal media communications route or path as the preferred communications route for future media sessions. Operation 1116 in some embodiments includes one or more sub-steps 1118, 1120, and 1122.

In sub-step 1118, the first UCBOT application updates the media quality metric scores for each of the plurality of communications routes between the first communications device and the second communications device for which an additional scheduled media test session was performed.

In sub-step 1120, the first UCBOT application updates the optimal media path ranking for each of the plurality of communications routes between the first communications device and the second communications device based on the results of the additional scheduled media test sessions and/or the comparisons of the results.

In sub-step 1122, the first UCBOT application updates the identity of the preferred optimal media path for the plurality of communications routes between the first communications device and the second communications device.

In some embodiments for example SDN embodiments in which the first communications device is an SDN enabled device, the step 1116 and/or sub-steps 1118, 1120, and/or 1122 include sending a message to a controller to install a routing update in the first communications device, the routing update including the information updated in each of the steps and/or sub-steps being performed. Operation proceeds from step 1116 to step 1106 via connection node E 1079, to step 1086 shown on FIG. 10E via connection node D 1057, and to step 1108 shown on FIG. 10G via connection node G 1104. In each case, the method 1000 continues as previously described.

Various additional features which may be included in various embodiments of the invention will now be discussed. In some embodiments of the communications method 1000, the media is real-time media including audio and/or video. In some embodiments of the communications method 1000, the first media communications session includes a first Real-time Transport Protocol (RTP) packet stream; and the step of communicating the received media of the first media communications session from the first communications device to the second communications device via the selected optimal media route includes routing packets of the first RTP packet stream from the first communications device to the second communications device via the selected optimal media route. In some such embodiments, the first RTP packet stream includes audio and/or video packet payloads. 1D. In some embodiments of communications method 1000, the first media communications session is one of the following a Voice Over Internet Protocol (VOIP) call session, a video call session, a conferencing call session, a collaborative session, or a whiteboarding session. In some embodiments of the communications method 1000, the plurality of communications routes includes routes containing different transmission technologies (e.g., different physical link transmission media (Ethernet cables/lines, T1/E1/DSL cables/lines, wireless communications links), different communications interfaces, different communications protocols such as for example Ethernet, DSL, wireless 5G). In some embodiments, the communications method 1000, the plurality of communications routes includes two or more of the following types of communications routes: a wired communications route, a fiber optics communications route, and a wireless communications route. In some embodiments of the communications method 1000, the first communications device performs the step or operation of determining that the received data of the first data communications session is real-time media (e.g., voice and/or video). In some embodiments, of the communications method 1000, the plurality of communications routes between the first communications device and the second communications device is determined using the Border Gateway Protocol and/or the Open Shortest Path First protocol.

In some embodiments of the communications method 1000, the first communications device and the second communications device are edge devices (e.g., Session Border Controllers, edge routers, Interconnection Border Control Function Gateways Gateways, programmable edge switches, SDN edge switches) located at different edges or borders of a first network and the first communications device is located at a border with a second network, the second communications device is located at a border with a third network, and the first media communications session traverses the first network using the optimal media communications route selected by the first UCBot application. In some other embodiments of the communications method 1000, the first communications device and the second communications device are peer devices located at different borders of a first network, and the first data of the first media communications session is received from a first endpoint device coupled to the first communications device. In some embodiments of the communications method 1000, the first communications device and/or the second communications device are implemented as virtual network functions on a compute node in a cloud system. In some embodiments, the media quality metrics are call quality metrics when a media test session is a call session, e.g., a Voice Over Internet Protocol call. In some embodiments of the communications method 1000, the one or more media quality metrics include one or more of the following: media delay, one way delay (OWD), jitter, packet loss, fidelity, Mean Opinion Score, Roundtrip Time (RTT).

In some embodiments of the communications method 1000, wherein the first communications device is a SDN network device, the step of updating by the first UCBot application or sending by the first UCBot application a message to a network controller to update a routing table on the first communications device to include the determined optimal media communications route as the preferred route for communicating media traffic from the first communications device to the second communications device includes updating a mapping of routes for received data packets including a first source IP address and port number (or port range) and a first destination IP address and port number (or port range).

In some embodiments of the communications method 1000 the plurality of communications routes are a set of shortest path routes between the first communications device and the second communications device. In some such embodiments, the set of shortest path routes are determined using a Border Control Gateway protocol shortest path algorithm or an Open Shortest Path First algorithm.

In some embodiments of the communications method 1000, when establishing a media test session the first UCBOT application sends a SDP offer message to the second UCBOT application which includes an Internet Protocol address and port number of an interface of the first communications device corresponding to a link to be tested for real-time media transmission during the test media session.

In some embodiments of the communications method 1000, the first UCBot application and the second UCBot application are part of a dynamically formed mesh network of UCBot applications, each UCBot application of the mesh network being executed on a communications device that routes or forwards real-time media communications packets. In some embodiments, the dynamically formed mesh network of UCBot applications is formed using the UCBot discovery process described above.

In some embodiments of the communications method 1000, IP rules are installed in the first communications device to implement the selection of the optimal media communications route. The IP rule in some such embodiments, includes a destination address of the second communications device which when matched on an incoming packet selects an interface with an IP address/port on the first communications device which is coupled to a physical link determined to be the optimal media communications route or path. In some such embodiments, the destination address is an IP address. In some embodiments, the destination address is an IP address and port number pair.

In some embodiments of the communications method 1000, instead of UCBOT applications, UCBot agents are employed on the first and/or second communications device.

In some embodiments of the communications method 1000, the first communications device determines that the second data communications session includes non-real-time data based on information included in a offer message, e.g., an SDP offer message, received from an originating device during establishment of the second data communications session prior to receipt of the data of the second data communications session.

In some embodiments, the first communications device and the second communications device exchange media quality metrics determined during each of the media test sessions performed for each of the communications routes between the first communications device and the second communications device.

In some embodiments, the first communications device sends information, e.g., assigned optimal media communications route rankings, about the optimal media communications route between the first communications device and the second communications device to the second communications device upon completion of the media test sessions for the plurality of communications routes between the first communications device and the second communications device. In some embodiments, the first communications device sends instructions to a controller, e.g., an SDN controller to update the second communications device with the optimal media communications route between the first communications device and the second communications device.

In some embodiments of the invention, when the first communications device is a first edge router and the second communications device is a second edge router and the communications session includes two media paths one from the first communications device to the second communications device and one from the second communications device to the first communications device, the first communications device installs an IP rule that any media packets received with a destination IP address of the second communications device will be transmitted on an egress IP address/port on the first communications device interface coupled to the physical link of a determined optimal media path between the first communications device and the second communications device. At the second communications device an IP rule is installed that any packets received by the second communications device including the destination IP address of the first communications device will be transmitted on an egress IP address/port on the second communications device interface coupled to the physical link of the determined optimal media path between the first communications device and the second communications device.

FIG. 9 illustrates an exemplary routing table 900 located within a first communications device, e.g., an edge router. In this example, the information in table 900 includes for each communications route from the first communications device to a second communications device, a communications route Identifier (ID), the shortest path ranking for the communications route, the optimal media path ranking for the communications route, and the media quality metric score for the communications route. The information included in exemplary table 900 is a sub-set of the routing information included in the first communications device which will typically include routing information for each of the routes or paths between the first communications and the other communications device with which it can communicate in the communications system.

The first row 910 of table 900 includes labels identifying the communication route information contained in the each of the columns. The entry column 902, row 910 indicates that the entries in column 902 includes the communications route ID. The entries in column 904 identify the shortest path ranking (col. 904, row 910 entry). The entries in column 906 indicate the assigned optimal media path ranking for the communications route (col. 906, row 910 entry). The entries in column 908 indicate the generated media quality metric score for the communications route (col. 908, row 910). In some embodiments, the routing table does not include the media quality metric score as this information is tracked in a separate table or record. In some embodiments, the routing table includes additional entries such as individual media quality metrics scores for each media quality metric tested, information indicating when the last media test session occurred, the first communications device interface(s) connected to the physical link of the corresponding communications route, and/or IP rule installed for an IP destination address. Row 912 includes information for the communications route 1 (column 902, row 912) which has the shortest path ranking of 1 (preferred shortest path) (col. 904, row 912), assigned optimal media path ranking 2 (col. 906, row 912), and media quality metric score of 75 (col. 908, row 912) which is the second highest media quality metric score. Row 914 includes information for the communications route 2 (column 902, row 914) which has shortest path ranking of 2 (col. 904, row 914), assigned optimal media path ranking 1 (preferred) (col. 906, row 914), and a media quality metric score of 85 which is the highest media quality metric score indicating it is the optimal or best media quality path based on media quality test metrics for the route/path. Row 916 includes information for the communications route 3 (column 902, row 916) which has shortest path ranking 3 (col. 904, row 916), assigned optimal media path ranking 3 (col. 906, row 916), and media quality score of 50 which is the lowest media quality score of the three communications routes in the routing table 900. The media quality metric scores of 75, 85 and 50 are only exemplary so as to illustrate the ranking of the optimal media path. The scores are generated from media quality metrics obtained by the first UCBOT executing on the first communications device during media test session. The metrics may be, and in some embodiments are, normalized and each of the metrics weighted according to importance. The media quality metric score then being generated based on the normalized and weighted media quality metrics for the communications route.

Set forth below are various exemplary numbered embodiments. Each set of numbered exemplary embodiments is numbered by itself with embodiments in a set referring to previous numbered embodiments in the same set.

LIST OF EXEMPLARY NUMBERED METHOD EMBODIMENTS

Method Embodiment 1. A communications method, comprising: receiving, at a first communications device, data of a first data communications session, said first data communications session being a first media communications session, said data being media; selecting an optimal media communications route from a plurality of communications routes between the first communications device and a second communications device; and communicating the received media of the first media communications session from the first communications device to the second communications device via the selected optimal media communications route.

Method Embodiment 1A. The communications method of method embodiment 1, wherein the media is realtime media including audio and/or video.

Method Embodiment 1B. The communications method of method embodiment 1, wherein the first media communications session includes a first Real-time Transport Protocol (RTP) packet stream; and wherein said communicating the received media of the first media communications session from the first communications device to the second communications device via the selected optimal media route includes routing packets of the first RTP packet stream from the first communications device to the second communications device via the selected optimal media route.

Method Embodiment 1C. The communications method of method embodiment 1B, wherein the first RTP packet stream includes audio or video packet payloads.

Method Embodiment 1D. The communications method of method embodiment 1, wherein the first media communications session is one of the following a Voice Over Internet Protocol (VOIP) call session, a video call session, a conferencing call session, a collaborative session, or a whiteboarding session.

Method Embodiment 1E. The communications method of method embodiment 1, wherein the plurality of communications routes includes routes containing different transmission technologies (e.g., different physical link transmission media (Ethernet cables/lines, T1/E1/DSL cables/lines, wireless communications links), different communications interfaces, different communications protocols such as for example Ethernet, DSL, wireless 5G).

Method Embodiment 1F. The communications method of method embodiment 1, wherein the plurality of communications routes includes two or more of the following types of communications routes: a wired communications route, a fiber optics communications route, and a wireless communications route.

Method Embodiment 1G. The communications method of method embodiment 1, wherein the first communications device determines that the received data of the first data communications session is real-time media (e.g., voice and/or video).

Method Embodiment 1H. The communications method of method embodiment 1, wherein said selecting an optimal media communications route from a plurality of communications routes between the first communications device and the second communications device includes: identifying a communications route marked as preferred for communicating media from a routing table in the first communications device including the plurality of communications routes from the first communications device to the second communications device.

Method Embodiment 1I. The communications method of method embodiment 1, wherein the plurality of communications routes between the first communications device and the second communications device is determined using the Border Gateway Protocol.

Method Embodiment 1J. The communications method of method embodiment 1, further comprising: during establishment of the first data communications session, said first communications device sends to the second communications device a Session Description Protocol message including a media description attribute advertising or identifying the Internet Protocol (IP) address/port number pair for the first communications device interface corresponding to the selected optimal media communications route upon which media of the first media communications session is to be received from the second communications device.

Method Embodiment 1J1. The communications method of method embodiment 1H, wherein the media description attribute is included in a SDP m line.

Method Embodiment 1J2. The communications method of method embodiment 1H, wherein the SDP message is an SDP offer message included in a Session Initiation Protocol Invite request message; wherein the IP address/port number pair for the first communications device interface corresponds to a Wi-Fi link selected as the optimal media communications route between the first communications device and the second communications device.

Method Embodiment 2. The communications method of method embodiment 1 further comprising: receiving, at the first communications device, data of a second data communications session, said data of said second data communications session not being real-time media; selecting a shortest open path first route from the plurality of communications routes between the first communications device and the second communications device; and communicating the received data of the second data communications session from the first communications device to the second communications device via the selected shortest open path first route.

Method Embodiment 2A. The communications method of method embodiment 2, wherein the first communications device determines that the received data of the first data communications session is real-time media (e.g., voice and/or video); and wherein the first communications device determines that the received data of the second data communications session is not real-time media.

Method Embodiment 3. The communications method of method embodiment 1 further comprising: prior to said selecting from a plurality of communications routes between the first communications device and a second communications device the optimal media communications route from the plurality of communications routes between the first communications device and the second communications device: determining at the first communications device, by a first Unified Communication BOT (UCBot) application executing on the first communications device, the optimal media communications route from the plurality of communications routes between the first communications device and the second communications device.

Method Embodiment 4. The communications method of method embodiment 3, wherein said determining at the first communications device, by a first Unified Communication BOT (UCBot) application, the optimal media communications route from the plurality of communications routes between the first communications device and the second communications device includes: performing a test media session on each of the plurality of communications routes between the first communications device and the second communications device; and determining from each of the performed media test sessions one or more media quality metrics for the route being tested.

Method Embodiment 4A. The communications method of method embodiment 4, wherein said determining at the first communications device, by a first Unified Communication BOT (UCBot) application, the optimal media communications route from the plurality of communications routes between the first communications device and the second communications device further includes: comparing the determined one or more media quality metrics for each of the plurality of routes between the first communications device and the second communications device; and determining the optimal media communications route based on the results of the comparisons of the determined one or more media quality metrics for each of the plurality of communications routes between the first communications device and the second communications device.

Method Embodiment 4B. The communications method of method embodiment 4, prior to performing a test media session on each of the plurality of communications routes between the first communications device and the second communications device, scheduling, by the first UCBot application the test media sessions with a second UCBot application executing on the second communications device.

Method Embodiment 4BB. The communications method of method embodiment 4B, wherein the first communications device and the second communications device are edge devices (e.g., Session Border Controllers, edge routers, Interconnection Border Control Function Gateways Gateways, programmable edge switches, SDN edge switches) located at different edges or borders of a first network; wherein the first communications device is located at a border with a second network; and wherein the second communications device is located at a border with a third network; and wherein the first media communications session traverses the first network using the optimal media communications route selected by the first UCBot.

Method Embodiment 4BBB. The communications method of method embodiment 4B, wherein the first communications device and the second communications device are peer devices located at different borders of a first network; and the first data of the first media session is received from a first endpoint device coupled to the first communications device.

Method Embodiment 4C. The communications method of method embodiment 4 further comprising: monitoring by the first UCBot application for an update or change (e.g., addition of a route, deletion of a route, change in preference of routes) to one or more routing table entries included in a routing table at the first communications device; said one or more routing table entries being for the plurality of communications routes between the first communications device and the second communications device.

Method Embodiment 4CC. The communications method of method embodiment 4 further comprising: operating the first UCBot application to perform a test media session on the new route between the first communications device and the second communications device when said monitoring by the first UCBot application results in the detection of a new route between the first communications device and the second communications device.

Method Embodiment 4D. The communications method of method embodiment 1, wherein the first communications device and/or the second communications device are implemented as virtual network functions on a compute node in the cloud.

Method Embodiment 5. The communications method of method embodiment 4, wherein said determining at the first communications device, by a first Unified Communication BOT (UCBot) application, the optimal media communications route from the plurality of communications routes between the first communications device and the second communications device includes: making said determination based on one or more of the one or more media quality metrics determined by the first UCBOT application for the plurality of communications routes tested.

Method Embodiment 5A. The communications method of method embodiment 5, wherein said media quality metrics are call quality metrics when a media test session is a call session (e.g., a VOIP call).

Method Embodiment 6. The communications method of method embodiment 4, wherein said one or more media quality metrics include one or more of the following: media delay, one way delay (OWD), jitter, packet loss, fidelity, Mean Opinion Score, Roundtrip Time (RTT).

Method Embodiment 7. The communications method of method embodiment 3 further comprising: after said first UCBot application determines at the first communications device the optimal media communications route from the plurality of communications routes between the first communications device and the second communications device, updating by the first UCBot application or sending by the first UCBot application a message to a network controller to update a routing table on the first communications device to include the determined optimal media communications route as the preferred route for communicating media traffic from the first communications device to the second communications device.

Method Embodiment 7A. The communications method of method embodiment 7, wherein the first communications device is a SDN network device; and wherein said updating by the first UCBot application or sending by the first UCBot application a message to a network controller to update a routing table on the first communications device to include the determined optimal media communications route as the preferred route for communicating media traffic from the first communications device to the second communications device includes updating a mapping of routes for received data packets including a first source IP address and port number (or port range) and a first destination IP address and port number (or port range).

Method Embodiment 7AA. The communications method of method embodiment 4A further comprising: assigning, by first UCBot application, an optimal media communications route ranking to each of the plurality of communications routes from the first communications device to the second communications device, said optimal media communications route rankings being based on the results of the comparison of the media quality metrics for the tested routes, said rankings being from highest to lowest with the highest being the most optimal route and the lowest being the least optimal route; updating by the first UCBot application or sending by the first UCBot application a message to a network controller to update a routing table on the first communications device to include the optimal media communications route ranking of each of the plurality of communications routes between the first communications device and the second communications device; said determined optimal media communications route between the first communications device and the second communications device being the communications route with the highest optimal media communications route ranking which is available for communicating the media of the first media communications session.

Method Embodiment 8. The communications method of method embodiment 1, wherein the plurality of communications routes are a set of shortest path routes between the first communications device and the second communications device.

Method Embodiment 8A. The communications method of method embodiment 8, wherein the set of shortest path routes are determined using a Border Control Gateway protocol shortest path algorithm or an Open Shortest Path First algorithm.

Method Embodiment 9. The communications method of method embodiment 4, wherein said plurality of communications routes between the first communications device and the second communications device includes a first communications route; and wherein said performing a test media session on each of the plurality of communications routes between the first communications device and the second communications device includes: establishing, by the first UCBot, a first test media session between the first UCBot application and a second UCBot application, said second UCBot application executing on the second communications device, said first test media session including at least one test RTP packet stream and at least one RTCP packet stream corresponding to the test RTP packet stream; and wherein said determining from each of the performed media test sessions one or more media quality metrics for the route being tested includes: determining a set of media quality metrics for the first communications route based on information (e.g., packet loss, jitter, one way delay, RTT) included in the RTCP packet stream corresponding to the test RPT packet stream and the contents of the payloads of the test RTP packet stream (e.g., MOS score based on voice media of a call session).

Method Embodiment 9A. The communications method of method embodiment 9 wherein said first UCBot application establishes said first test media session by exchanging Session Initiation Protocol messages and Session Description Protocol messages with the second UCBot application.

Method Embodiment 9B. The communications method of method embodiment 9A, wherein the Session Description Protocol messages exchanged include a Session Description Protocol Offer message including an Internet Protocol address and port number of an interface of the first communications device corresponding to a link to be tested for real-time media transmission during the first test media session.

Method Embodiment 9BB. The communications method of method embodiment 9B, wherein the IP address and port corresponds to a wireless link coupled to the first communications device on which the first UCBot is executing.

Method Embodiment 9BBB. The communications method of method embodiment 9BB, wherein the wireless link is a Wi-Fi link.

Method Embodiment 10. The communications method of method embodiment 9, wherein said first UCBot application and second UCBot application are part of a dynamically formed mesh network of UCBot applications, each UCBot application of the mesh network being executed on a communication device that routes or forwards real-time media communications packets.

Method Embodiment 11. The communications method of method embodiment 9 further comprising: implementing, by the first UCBot application, a discovery process to discover other UCBot applications with which the first UCBot application can communicate, said discovery process including transmitting a UCBot discovery message on a multicast Internet Protocol address to other UCBot applications.

Method Embodiment 11A. The communications method of method embodiment 11, wherein the multicast IP address is a fixed multicast address registered with the Internet Assigned Numbers Authority.

Method Embodiment 11B. The communications method of method embodiment 11, wherein the UCBot discovery message includes information about the UCBot application transmitting the UCBot discovery message (e.g., UCBot version, UCBot ID (derived from UCBot's Source Internet Protocol Address), Source Internet Protocol Address, Real-time-Media capabilities (voice, video, etc.), signaling capabilities (e.g., signaling protocols supported such as Session Initiation Protocol, Session Description Protocol, H.323 protocol, RTP protocol, RTCP protocol), local time in UTC format, UDP signaling ports, TCP signaling ports, media codecs supported, transaction-Id, shared key phrase installed or configured on the UCBot)).

Method Embodiment 11C. The communications method of method embodiment 11B further comprising: encrypting, by the first UCBot application, the contents of the UCBot discovery message with a shared private key prior to transmitting the UCBot discovery message.

Method Embodiment 11D. The communications method of method embodiment 11C, wherein said discovery process further includes receiving, by the first UCBot application from one or more UCBot applications which received the UCBot discovery message, a UCBOT discovery response message.

Method Embodiment 11E. The communications method of method embodiment 11D, wherein said UCBot discovery response message is a unicast message transmitted to an IP address of the first UCBot included in the UCBOT discovery message.

Method Embodiment 11F. The communications method of method embodiment 11E, wherein said UCBot discovery response message includes information about the responding UCBot application (e.g., UCBot version, UCBot ID (derived from UCBot's Source Internet Protocol Address), Source Internet Protocol Address, Realtime-Media capabilities (voice, video, etc.), signaling capabilities (e.g., signaling protocols supported such as Session Initiation Protocol, Session Description Protocol, H.323 protocol, RTP protocol, RTCP protocol), local time in UTC format, UDP signaling ports, TCP signaling ports, media codecs supported, transaction-Id, shared key phrase installed or configured on the UCBot)).

Method Embodiment 11G. The communications method of method embodiment 11F, wherein the UCBot discovery response message contents include a shared key phrase installed or configured on the responding UCBot application, said shared key phrase being the same as a shared key phrase included in the contents of the transmitted discovery message; and wherein contents of said UCBot discovery response message is encrypted by a responding UCBot application using the same shared private key as used to encrypt the UCBot discovery message.

Method Embodiment 12. A communications method comprising: implementing a UCBot application or agent on each of a plurality of communications devices; each UCBot application or agent independently implementing a UCBot discovery process to discover other UCBot applications or agents with which the UCBot application or agent can communicate; executing test media sessions between the UCBot applications or agents to determine media quality metrics for each route between the source UCBot application or agent; each UCBot application or agent determining the optimal real-time media route between the communications device in which the UCBot application or agent is implemented and each of the other communications devices in which a UCBot application or agent is implemented with which the UCBot application can communicate, said optimal real-time media routes being determined based on the media quality metrics determined for each route; each UCBot application or agent updating a routing table included in the communications device in which the UCBot application or agent is implemented to include the determined optimal real-time media routes determined as the preferred routes for communicating real-time media.

Method Embodiment 12A. The communications method of method embodiment 12 further comprising: periodically scheduling, by each UCBot application or agent, test media sessions to evaluate different paths or routes between the UCBot application or agent and each of the other UCBot applications or agents it discovered during said UCBot discovery process; performing, by the UCBot applications or agents, the scheduled test media sessions at the scheduled time; determining by each UCBot application or agent based on the performed scheduled test media sessions results whether there has been a change to any of the previously determined optimal media routes between the communications devices; and each UCBot application or agent updating the routing table included in the communications device in which the UCBot application or agent is implemented to reflect any changes determined in the optimal real-time media routes between the communications devices.

Method Embodiment 12B. The communications method of method embodiment 12 further comprising: each UCBot application or agent upon detection of a new route for a communication path between the communications device in which the UCBot application or agent is implemented and another communications device in which another UCBot application or agent is implemented, executing a test media session on the route with the UCBot application or agent implemented in the another communications device to determine real-time media quality metrics for the new route as part of evaluating whether the new route is an optimal media route.

Method Embodiment 12C. The communications method of method embodiment 12, wherein the communications devices are edge devices/routers of a communications system including a plurality of networks, said edge devices and edge routers being located at the borders of the plurality of networks and interconnecting the plurality of networks.

Method Embodiment 12CC. The communications method of method embodiment 12C, wherein the communication system includes a plurality of different administrative domains, at least two of said plurality of different administration domains installing or configuring a private shared key and a shared phrase in said UCBot applications implemented on the edge devices and the edge routers which are part of said at least two of said plurality of different administration domains, said private shared key being used to encrypt and decrypt the content of UCBot messages, said shared phrase being included in UCBot messages to identify UCBot applications and agents which have been configured to exchange information.

List of Exemplary Numbered System Embodiments:

System Embodiment 1. A communications system comprising: a first communications device including a first processor configured to control the first communications device to: receive data of a first data communications session, said first data communications session being a first media communications session, said data being media; select an optimal media communications route from a plurality of communications routes between the first communications device and a second communications device; and communicate the received media of the first media communications session from the first communications device to the second communications device via the selected optimal media communications route.

System Embodiment 1A. The communications system of system embodiment 1, wherein the media is realtime media including audio and/or video.

System Embodiment 1B. The communications system of system embodiment 1, wherein the first media communications session includes a first Real-time Transport Protocol (RTP) packet stream; and wherein said communicating the received media of the first media communications session from the first communications device to the second communications device via the selected optimal media route includes routing packets of the first RTP packet stream from the first communications device to the second communications device via the selected optimal media route.

System Embodiment 1C. The communications system of system embodiment 1B, wherein the first RTP packet stream includes audio or video packet payloads.

System Embodiment 1D. The communications system of system embodiment 1, wherein the first media communications session is one of the following a Voice Over Internet Protocol (VOIP) call session, a video call session, a conferencing call session, a collaborative session, or a whiteboarding session.

System Embodiment 1E. The communications system of system embodiment 1, wherein the plurality of communications routes includes routes containing different transmission technologies (e.g., different physical link transmission media (Ethernet cables/lines, T1/E1/DSL cables/lines, wireless communications links), different communications interfaces, different communications protocols such as for example Ethernet, DSL, wireless 5G).

System Embodiment 1F. The communications system of system embodiment 1, wherein the plurality of communications routes includes two or more of the following types of communications routes: a wired communications route, a fiber optics communications route, and a wireless communications route.

System Embodiment 1G. The communications system of system embodiment 1, wherein the first communications device determines that the received data of the first data communications session is real-time media (e.g., voice and/or video).

System Embodiment 1H. The communications system of system embodiment 1, wherein said selecting an optimal media communications route from a plurality of communications routes between the first communications device and the second communications device includes: identifying a communications route marked as preferred for communicating media from a routing table in the first communications device including the plurality of communications routes from the first communications device to the second communications device.

System Embodiment 11. The communications system of system embodiment 1, wherein the plurality of communications routes between the first communications device and the second communications device is determined using the Border Gateway Protocol.

System Embodiment 1J. The communications method of system embodiment 1, further comprising: during establishment of the first data communications session, said first communications device sends to the second communications device a Session Description Protocol message including a media description attribute advertising or identifying the Internet Protocol (IP) address/port number pair for the first communications device interface corresponding to the selected optimal media communications route upon which media of the first media communications session is to be received from the second communications device.

System Embodiment 1J1. The communications system of system embodiment 1H, wherein the media description attribute is included in a SDP m line.

System Embodiment 1J2. The communications system of system embodiment 1H, wherein the SDP message is an SDP offer message included in a Session Initiation Protocol Invite request message; wherein the IP address/port number pair for the first communications device interface corresponds to a Wi-Fi link selected as the optimal media communications route between the first communications device and the second communications device.

System Embodiment 2. The communications system of system embodiment 1, wherein said processor further controls the first communications device to: receive data of a second data communications session, said data of said second data communications session not being real-time media; select a shortest open path first route from the plurality of communications routes between the first communications device and the second communications device; and communicate the received data of the second data communications session from the first communications device to the second communications device via the selected shortest open path first route.

System Embodiment 2A. The communications method of system embodiment 2, wherein the first communications device determines that the received data of the first data communications session is real-time media (e.g., voice and/or video); and wherein the first communications device determines that the received data of the second data communications session is not real-time media.

System Embodiment 3. The communications system of system embodiment 1 wherein: prior to said selecting from a plurality of communications routes between the first communications device and a second communications device the optimal media communications route from the plurality of communications routes between the first communications device and the second communications device, the processor further control the first communications device to: determine at the first communications device, by a first Unified Communication BOT (UCBot) application executing on the first communications device, the optimal media communications route from the plurality of communications routes between the first communications device and the second communications device.

System Embodiment 4. The communications system of system embodiment 3, wherein said to determine at the first communications device, by a first Unified Communication BOT (UCBot) application, the optimal media communications route from the plurality of communications routes between the first communications device and the second communications device includes: performing a test media session on each of the plurality of communications routes between the first communications device and the second communications device; and determining from each of the performed media test sessions one or more media quality metrics for the route being tested.

System Embodiment 4A. The communications system of system embodiment 4, wherein said to determine at the first communications device, by a first Unified Communication BOT (UCBot) application, the optimal media communications route from the plurality of communications routes between the first communications device and the second communications device further includes: comparing the determined one or more media quality metrics for each of the plurality of routes between the first communications device and the second communications device; and determining the optimal media communications route based on the results of the comparisons of the determined one or more media quality metrics for each of the plurality of communications routes between the first communications device and the second communications device.

System Embodiment 4B. The communications system of system embodiment 4, wherein prior to performing a test media session on each of the plurality of communications routes between the first communications device and the second communications device, the processor further controls the first communications device to schedule, by the first UCBot application, the test media sessions with a second UCBot application executing on the second communications device.

System Embodiment 4BB. The communications system of system embodiment 4B, wherein the first communications device and the second communications device are edge devices (e.g., Session Border Controllers, edge routers, Interconnection Border Control Function Gateways Gateways, programmable edge switches, SDN edge switches) located at different edges or borders of a first network; wherein the first communications device is located at a border with a second network; and wherein the second communications device is located at a border with a third network; and wherein the first media communications session traverses the first network using the optimal media communications route selected by the first UCBot.

System Embodiment 4BBB. The communications system of system embodiment 4B, wherein the first communications device and the second communications device are peer devices located at different borders of a first network; and the first data of the first media session is received from a first endpoint device coupled to the first communications device.

System Embodiment 4C. The communications system of system embodiment 1, wherein the first communications device and/or the second communications device are implemented as virtual network functions on a compute node in the cloud.

System Embodiment 4CC. The communications system of system embodiment 4, wherein the processor further controls the first communications device to operate the first UCBot application to perform a test media session on the new route between the first communications device and the second communications device when said monitoring by the first UCBot application results in the detection of a new route between the first communications device and the second communications device.

System Embodiment 4D. The communications system of system embodiment 1, wherein the first communications device and/or the second communications device are implemented as virtual network functions on a compute node in the cloud.

System Embodiment 5. The communications system of system embodiment 4, wherein said determining at the first communications device, by a first Unified Communication BOT (UCBot) application, the optimal media communications route from the plurality of communications routes between the first communications device and the second communications device includes: making said determination based on one or more of the one or more media quality metrics determined by the first UCBOT application for the plurality of communications routes tested.

System Embodiment 5A. The communications system of system embodiment 5, wherein said media quality metrics are call quality metrics when a media test session is a call session (e.g., a VOIP call).

System Embodiment 6. The communications system of system embodiment 4, wherein said one or more media quality metrics include one or more of the following: media delay, one way delay (OWD), jitter, packet loss, fidelity, Mean Opinion Score, Roundtrip Time (RTT).

System Embodiment 7. The communications system of system embodiment 3, wherein after said first UCBot application determines at the first communications device the optimal media communications route from the plurality of communications routes between the first communications device and the second communications device, the processor further controls the first UCBot application to update or send a message to a network controller to update a routing table on the first communications device to include the determined optimal media communications route as the preferred route for communicating media traffic from the first communications device to the second communications device.

System Embodiment 7A. The communications system of system embodiment 7, wherein the first communications device is a SDN network device; and wherein said update or send a message to a network controller to update a routing table on the first communications device to include the determined optimal media communications route as the preferred route for communicating media traffic from the first communications device to the second communications device includes updating a mapping of routes for received data packets including a first source IP address and port number (or port range) and a first destination IP address and port number (or port range).

System Embodiment 7AA. The communications system of system embodiment 4A wherein said processor further controls the first UCBot executing on the first communications device to: assign an optimal media communications route ranking to each of the plurality of communications routes from the first communications device to the second communications device, said optimal media communications route rankings being based on the results of the comparison of the media quality metrics for the tested routes, said rankings being from highest to lowest with the highest being the most optimal route and the lowest being the least optimal route; update or send by the first UCBot application a message to a network controller to update a routing table on the first communications device to include the optimal media communications route ranking of each of the plurality of communications routes between the first communications device and the second communications device, said determined optimal media communications route between the first communications device and the second communications device being the communications route with the highest optimal media communications route ranking which is available for communicating the media of the first media communications session.

System Embodiment 8. The communications system of system embodiment 1, wherein the plurality of communications routes are a set of shortest path routes between the first communications device and the second communications device.

System Embodiment 8A. The communications system of system embodiment 8, wherein the set of shortest path routes are determined using a Border Control Gateway protocol shortest path algorithm or an Open Shortest Path First algorithm.

System Embodiment 9. The communications system of system embodiment 4, wherein said plurality of communications routes between the first communications device and the second communications device includes a first communications route; and wherein said performing a test media session on each of the plurality of communications routes between the first communications device and the second communications device includes: establishing, by the first UCBot, a first test media session between the first UCBot application and a second UCBot application, said second UCBot application executing on the second communications device, said first test media session including at least one test RTP packet stream and at least one RTCP packet stream corresponding to the test RTP packet stream; and wherein said determining from each of the performed media test sessions one or more media quality metrics for the route being tested includes: determining a set of media quality metrics for the first communications route based on information (e.g., packet loss, jitter, one way delay, RTT) included in the RTCP packet stream corresponding to the test RPT packet stream and the contents of the payloads of the test RTP packet stream (e.g., MOS score based on voice media of a call session).

System Embodiment 9A. The communications system of system embodiment 9 wherein said first UCBot application establishes said first test media session by exchanging Session Initiation Protocol messages and Session Description Protocol messages with the second UCBot application.

System Embodiment 9B. The communications system of system embodiment 9A, wherein the Session Description Protocol messages exchanged include a Session Description Protocol Offer message including an Internet Protocol address and port number of an interface of the first communications device corresponding to a link to be tested for real-time media transmission during the first test media session.

System Embodiment 9BB. The communications system of system embodiment 9B, wherein the IP address and port corresponds to a wireless link coupled to the first communications device on which the first UCBot is executing.

System Embodiment 9BBB. The communications system of system embodiment 9BB, wherein the wireless link is a Wi-Fi link.

System Embodiment 10. The communications system of system embodiment 9, wherein said first UCBot application and second UCBot application are part of a dynamically formed mesh network of UCBot applications, each UCBot application of the mesh network being executed on a communication device that routes or forwards real-time media communications packets.

System Embodiment 11. The communications system of system embodiment 9, wherein said processor further controls the first communications device to implement, by the first UCBot application, a discovery process to discover other UCBot applications with which the first UCBot application can communicate, said discovery process including transmitting a UCBot discovery message on a multicast Internet Protocol address to other UCBot applications.

System Embodiment 11A. The communications system of system embodiment 11, wherein the multicast IP address is a fixed multicast address registered with the Internet Assigned Numbers Authority.

System Embodiment 11B. The communications system of system embodiment 11, wherein the UCBot discovery message includes information about the UCBot application transmitting the UCBot discovery message (e.g., UCBot version, UCBot ID (derived from UCBot's Source Internet Protocol Address), Source Internet Protocol Address, Real-time-Media capabilities (voice, video, etc.), signaling capabilities (e.g., signaling protocols supported such as Session Initiation Protocol, Session Description Protocol, H.323 protocol, RTP protocol, RTCP protocol), local time in UTC format, UDP signaling ports, TCP signaling ports, media codecs supported, transaction-Id, shared key phrase installed or configured on the UCBot)).

System Embodiment 11C. The communications system of system embodiment 11B, wherein the processor further controls the first communications device to: encrypt, by the first UCBot application, the contents of the UCBot discovery message with a shared private key prior to transmitting the UCBot discovery message.

System Embodiment 11D. The communications system of system embodiment 11C, wherein said discovery process further includes receiving, by the first UCBot application from one or more UCBot applications which received the UCBot discovery message, a UCBOT discovery response message.

System Embodiment 11E. The communications system of system embodiment 11D, wherein said UCBot discovery response message is a unicast message transmitted to an IP address of the first UCBot included in the UCBOT discovery message.

System Embodiment 11F. The communications system of system embodiment 11E, wherein said UCBot discovery response message includes information about the responding UCBot application (e.g., UCBot version, UCBot ID (derived from UCBot's Source Internet Protocol Address), Source Internet Protocol Address, Realtime-Media capabilities (voice, video, etc.), signaling capabilities (e.g., signaling protocols supported such as Session Initiation Protocol, Session Description Protocol, H.323 protocol, RTP protocol, RTCP protocol), local time in UTC format, UDP signaling ports, TCP signaling ports, media codecs supported, transaction-Id, shared key phrase installed or configured on the UCBot)).

System Embodiment 11G. The communications system of system embodiment 11F, wherein the UCBot discovery response message contents include a shared key phrase installed or configured on the responding UCBot application, said shared key phrase being the same as a shared key phrase included in the contents of the transmitted discovery message; and wherein contents of said UCBot discovery response message is encrypted by a responding UCBot application using the same shared private key as used to encrypt the UCBot discovery message.

System Embodiment 12. A communications system comprising: a plurality of communications devices that route real-time media traffic, at least some of said plurality of communications devices including a UCBot application; each UCBot application implementing a discovery process to identify other UCBot applications with which it can communicate; each UCBot application performing test media sessions on routes to the other UCBot applications with which it can communicate; each UCBot application evaluating the routes to the other UCBot applications; each UCBot determining the optimal media route to the other UCBot applications based on the evaluations of the routes to the other UCBot applications.

System Embodiment 12A. The communications system of system embodiment 12, each UCBot application or agent periodically schedules test media sessions to evaluate different paths or routes between the UCBot application or agent and each of the other UCBot applications or agents it discovered during said UCBot discovery process; wherein each of the UCBot applications or agents performs the scheduled test media sessions at the scheduled time; wherein each UCBot application or agent determines based on the performed scheduled test media sessions results whether there has been a change to any of the previously determined optimal media routes between the communications devices; and each UCBot application or agent updates the routing table included in the communications device in which the UCBot application or agent is implemented to reflect any changes determined in the optimal real-time media routes between the communications devices.

System Embodiment 12B. The communications system of system embodiment 12, wherein each UCBot application or agent upon detection of a new route for a communication path between the communications device in which the UCBot application or agent is implemented and another communications device in which another UCBot application or agent is implemented, executing a test media session on the route with the UCBot application or agent implemented in the another communications device to determine real-time media quality metrics for the new route as part of evaluating whether the new route is an optimal media route.

System Embodiment 12C. The communications system of system embodiment 12, wherein the communications devices are edge devices/routers of a communications system including a plurality of networks, said edge devices and edge routers being located at the borders of the plurality of networks and interconnecting the plurality of networks.

System Embodiment 12CC. The communications system of System Embodiment 12C, wherein the communication system includes a plurality of different administrative domains, at least two of said plurality of different administration domains installing or configuring a private shared key and a shared phrase in said UCBot applications implemented on the edge devices and the edge routers which are part of said at least two of said plurality of different administration domains, said private shared key being used to encrypt and decrypt the content of UCBot messages, said shared phrase being included in UCBot messages to identify UCBot applications and agents which have been configured to exchange information.

List of Exemplary Numbered Non-transitory Machine Readable Medium Embodiments:

Non-transitory Machine Readable Medium Embodiment 1. A non-transitory machine readable medium including processor executable instructions, which when executed by a processor of a first communications device control the first communications device to: receive data of a first data communications session, said first data communications session being a first media communications session, said data being media; select an optimal media communications route from a plurality of communications routes between the first communications device and a second communications device; and communicate the received media of the first media communications session from the first communications device to the second communications device via the selected optimal media communications route.

Non-transitory Machine Readable Medium Embodiment 1A. The non-transitory machine readable medium of Non-transitory Machine Readable Medium Embodiment 1, wherein the media is realtime media including audio and/or video.

Non-transitory Machine Readable Medium Embodiment 1B. The non-transitory machine readable medium of Non-transitory Machine Readable Medium Embodiment 1, wherein the first media communications session includes a first Real-time Transport Protocol (RTP) packet stream; and wherein said to communicate the received media of the first media communications session from the first communications device to the second communications device via the selected optimal media route includes routing packets of the first RTP packet stream from the first communications device to the second communications device via the selected optimal media route.

Non-transitory Machine Readable Medium Embodiment 1C. The non-transitory machine readable medium of Non-transitory Machine Readable Medium Embodiment 1B, wherein the first RTP packet stream includes audio or video packet payloads.

Non-transitory Machine Readable Medium Embodiment 1D. The non-transitory machine readable medium of Non-transitory Machine Readable Medium Embodiment 1, wherein the first media communications session is one of the following a Voice Over Internet Protocol (VOIP) call session, a video call session, a conferencing call session, a collaborative session, or a whiteboarding session.

Non-transitory Machine Readable Medium Embodiment 1E. The non-transitory machine readable medium of Non-transitory Machine Readable Medium Embodiment 1, wherein the plurality of communications routes includes routes containing different transmission technologies (e.g., different physical link transmission media (Ethernet cables/lines, T1/E1/DSL cables/lines, wireless communications links), different communications interfaces, different communications protocols such as for example Ethernet, DSL, wireless 5G).

Non-transitory Machine Readable Medium Embodiment 1F. The non-transitory machine readable medium of Non-transitory Machine Readable Medium Embodiment 1, wherein the plurality of communications routes includes two or more of the following types of communications routes: a wired communications route, a fiber optics communications route, and a wireless communications route.

Non-transitory Machine Readable Medium Embodiment 2. The non-transitory machine readable medium of Non-transitory Machine Readable Medium Embodiment 1 further including instructions which when executed control the first communications device to: receive data of a second data communications session, said data of said second data communications session not being real-time media; select a shortest open path first route from the plurality of communications routes between the first communications device and the second communications device; and communicate the received data of the second data communications session from the first communications device to the second communications device via the selected shortest open path first route.

Non-transitory Machine Readable Medium Embodiment 3. The non-transitory machine readable medium of Non-transitory Machine Readable Medium Embodiment 1 further including instructions which when executed control the first communications device to: prior to said selecting from a plurality of communications routes between the first communications device and a second communications device the optimal media communications route from the plurality of communications routes between the first communications device and the second communications device: determining at the first communications device, by a first Unified Communication BOT (UCBot) application executing on the first communications device, the optimal media communications route from the plurality of communications routes between the first communications device and the second communications device.

Non-transitory Machine Readable Medium Embodiment 4. The non-transitory machine readable medium of Non-transitory Machine Readable Medium Embodiment 3, wherein said determining at the first communications device, by a first Unified Communication BOT (UCBot) application, the optimal media communications route from the plurality of communications routes between the first communications device and the second communications device includes: performing a test media session on each of the plurality of communications routes between the first communications device and the second communications device; and determining from each of the performed media test sessions one or more media quality metrics for the route being tested.

The techniques of various embodiments may be implemented using software, hardware and/or a combination of software and hardware. Various embodiments are directed to apparatus, e.g., communications devices, edge devices, edge routers, call processing devices, gateways, session border controllers, network nodes and/or network equipment devices. Various embodiments are also directed to methods, e.g., method of controlling and/or operating devices such communications devices, edge devices, edge routers, call processing devices, gateways, session border controllers, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or, in some embodiments, logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications devices, edge devices, edge routers, call processing devices, gateways, session border controllers, network nodes and/or network equipment devices, including a processor configured to implement one, multiple or all of the steps of one or more methods of the invention.

In some embodiments, the processor or processors, e.g., CPUs, of one or more devices, e.g., computing nodes such as call processing devices, session border controllers are configured to perform the steps of the methods described as being performed by the computing nodes, e.g., communications devices, edge devices, edge routers, call processing devices, gateways, session border controllers, network nodes and/or network equipment devices. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., computing node such as communications devices, edge devices, edge routers, call processing devices, gateways, session border controllers, network nodes and/or network equipment devices with a processor which includes a component corresponding to each of the steps of the various described methods performed by the device in which the processor is included. In some but not all embodiments a device, e.g., computing node such as a communications device, edge device, edge router, call processing device, gateway, session border controller, network nods and/or network equipment device, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a computing device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device, edge device, edge router, call processing device, gateway, session border controller, network node and/or network equipment device or other device described in the present application.

Numerous additional variations on the methods and apparatus of the various embodiments described above will be apparent to those skilled in the art in view of the above description. Such variations are to be considered within the scope of the invention. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:

discovering, by a first Unified Communication BOT (UCBot) application, executing on a first communications device, using a discovery process, a second UCBot application executing on a second communications device;

subsequent to discovering the second UCBot application, executing on the second communications device, using said discovery process, performing, by the first UCBot application, a test media session on each of a plurality of communications routes between the first communications device and the second communications device; and determining, by the first UCBot application, an optimal media communications route from the plurality of communications routes between the first communications device and the second communications device based on the results of the performed test media sessions; and wherein said discovering, by the first UCBot application, executing on the first communications device, using said discovery process, the second UCBot application, executing on the second communications device, includes:

transmitting, by the first UCBot application, a UCBot discovery message to said second UCBot application, executing on said second communications device, said UCBot discovery message including information about the first UCBot application, said information about the first UCBot application including: a Source Internet Protocol Address, Realtime-Media capabilities, signaling capabilities, local time in UTC format, UDP signaling ports, TCP signaling ports, and media codecs supported.

2. The communications method of claim 1, wherein said UCBot discovery message is transmitted on a multicast Internet Protocol address to said second UCBot application.

3. The communications method of claim 2, wherein said determining the optimal media communications route from the plurality of communications routes between the first communications device and the second communications device based on the results of the performed test media sessions includes: ranking each of the plurality of communications routes based on quality metrics.

4. The communications method of claim 3, wherein said discovering, by the first UCBot application, executing on the first communications device, using said discovery process, the second UCBot application, executing on the second communications device, further includes: receiving, by the first UCBot application, from the second UCBot application a UCBot discovery response message in response to the transmitted UCBot discovery message.

5. The communications method of claim 3, wherein the first communications device and the second communications device are edge devices located at different edges or borders of a first network.

6. The communications method of claim 4, wherein said UCBot discovery response message includes information about the second UCBot application, said information about the second UCBot application including: second UCBot's Source Internet Protocol Address, Realtime-Media capabilities, signaling capabilities, local time in UTC format, UDP signaling ports, TCP signaling ports, and media codecs supported.

7. The communications method of claim 6, wherein said information about the second UCBot application further includes a shared key phrase installed or configured on the second communications device on which the second UCBot application is executing.

8. The communications method of claim 1, further comprising:

determining, by the first UCBot application, from each of the performed test media sessions one or more media quality metrics for the route being tested; and wherein said determining, by the first UCBot application, the optimal media communications route from the plurality of communications routes between the first communications device and the second communications device based on the results of the performed test media sessions includes: making, by the first UCBOT application, a determination of the optimal media communications route from the plurality of communications routes between the first communications device and the second communications device based on one or more of the one or more media quality metrics determined by the first UCBot application for the plurality of communications routes tested.

9. The communications method of claim 1, wherein said signaling capabilities include signaling protocols supported by the first UCBot application; and wherein said information about the first UCBot application further includes a shared key phrase installed or configured on the first communication device on which the first UCBot application is executing.

10. The communications method of claim 1, further comprising:

communicating, by the first communications device, media of a communications session to the second communications device using said determined optimal media communications route.

11. The communications method of claim 1, wherein at least one of the first communications device or the second communications device is implemented as a virtual network function on a compute node in a cloud.

12. A communications system comprising:

a first communications device including a first processor configured to control the first communications device to perform the following operations:

discovering, by a first Unified Communication BOT (UCBot) application, executing on the first communications device, using a discovery process, a second UCBot application executing on a second communications device;

subsequent to discovering the second UCBot application, executing on the second communications device, using said discovery process, performing, by the first UCBot application, a test media session on each of a plurality of communications routes between the first communications device and the second communications device; and determining, by the first UCBot application, an optimal media communications route from the plurality of communications routes between the first communications device and the second communications device based on the results of the performed test media sessions; and wherein said discovering, by the first UCBot application executing, on the first communications device, using said discovery process, the second UCBot application, executing on the second communications device, includes:

transmitting, by the first UCBot application, a UCBot discovery message to said second UCBot application, executing on said second communications device, said UCBot discovery message including information about the first UCBot application, said information about the first UCBot application including: a Source Internet Protocol Address, Realtime-Media capabilities, signaling capabilities, local time in UTC format, UDP signaling ports, TCP signaling ports, and media codecs supported.

13. The communications system of claim 12, wherein said UCBot discovery message is transmitted on a multicast Internet Protocol address to the second UCBot application.

14. The communications system of claim 13, wherein said determining of the optimal media communications route from the plurality of communications routes between the first communications device and the second communications device based on the results of the performed test media sessions includes: ranking each of the plurality of communications routes based on quality metrics.

15. The communications system of claim 14, wherein said discovering, by the first UCBot application, executing on the first communications device, using said discovery process, the second UCBot application, executing on the second communications device, further includes: receiving, by the first UCBot application, from the second UCBot application a UCBot discovery response message in response to the transmitted UCBot discovery message.

16. The communications system of claim 15, wherein said UCBot discovery response message includes information about the second UCBot application, said information about the second UCBot application including: second UCBot's Source Internet Protocol Address, Realtime-Media capabilities, signaling capabilities, local time in UTC format, UDP signaling ports, TCP signaling ports, and media codecs supported.

17. The communications system of claim 16, wherein the first communications device and the second communications device are edge devices located at different edges or borders of a first network.

18. The communications system of claim 12, wherein the first processor is further configured to control the first communications device to perform the following operations:

determining, by the first UCBot application, from each of the performed test media sessions one or more media quality metrics for the route being tested; and wherein said determining, by the first UCBot application, the optimal media communications route from the plurality of communications routes between the first communications device and the second communications device based on the results of the performed test media sessions includes: making, by the first UCBot application, a determination of the optimal media communications route from the plurality of communications routes between the first communications device and the second communications device based on one or more of the one or more media quality metrics determined by the first UCBot application for the plurality of communications routes tested.

19. The communications system of claim 12, wherein said signaling capabilities include signaling protocols supported by the first UCBot application; and wherein said information about the first UCBot application further includes a shared key phrase installed or configured on the first communications device on which the first UCBot application is executing.

20. A non-transitory machine readable medium including processor executable instructions, which when executed by a processor of a first communications device control the first communications device to perform the steps of:

discovering, by a first Unified Communication BOT (UCBot) application, executing on the first communications device, using a discovery process, a second UCBot application executing on a second communications device;

subsequent to discovering the second UCBot application, executing on the second communications device, using said discovery process, performing, by the first UCBot application, a test media session on each of a plurality of communications routes between the first communications device and the second communications device; and determining, by the first UCBot application, an optimal media communications route from the plurality of communications routes between the first communications device and the second communications device based on the results of the performed test media sessions; and wherein said discovering, by the first UCBot application, executing on the first communications device, using said discovery process, the second UCBot application, executing on the second communications device, includes:

transmitting, by the first UCBot application, a UCBot discovery message to said second UCBot application, executing on said second communications device, said UCBot discovery message including information about the first UCBot application, said information about the first UCBot application including: a Source Internet Protocol Address, Realtime-Media capabilities, signaling capabilities, local time in UTC format, UDP signaling ports, TCP signaling ports, and media codecs supported.

* * * * *